US012156098B2

(12) United States Patent
Saha et al.

(10) Patent No.: US 12,156,098 B2
(45) Date of Patent: Nov. 26, 2024

(54) DETERMINING, AT A RADIO ACCESS NETWORK NODE, A LOCATION-BASED STATE OF A USER EQUIPMENT

(71) Applicant: QUALCOMM Incorporated, San Diego, CA (US)

(72) Inventors: Chiranjib Saha, San Diego, CA (US); Alberto Rico Alvarino, San Diego, CA (US); Sunghoon Kim, San Diego, CA (US); Umesh Phuyal, San Diego, CA (US); Stefano Faccin, San Ysidro, CA (US); Stephen William Edge, Escondido, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 17/643,810

(22) Filed: Dec. 10, 2021

(65) Prior Publication Data

US 2023/0188938 A1 Jun. 15, 2023

(51) Int. Cl.
*H04W 4/029* (2018.01)
(52) U.S. Cl.
CPC .................... *H04W 4/029* (2018.02)
(58) Field of Classification Search
None
See application file for complete search history.

(56) References Cited

U.S. PATENT DOCUMENTS

| | | | |
|---|---|---|---|
| 11,290,868 B2* | 3/2022 | Zhang | G08G 5/0013 |
| 11,445,360 B2* | 9/2022 | Zhang | H04W 8/02 |
| 2023/0328683 A1* | 10/2023 | Zhang | H04W 64/00 |
| | | | 455/456.1 |

FOREIGN PATENT DOCUMENTS

WO WO-2019029004 A1 2/2019

OTHER PUBLICATIONS

3GPP TR 23.731: "3rd Generation Partnership Project, Technical Specification Group Services and System Aspects, Study on Enhancement to the 5GC Location Services (Release 16)", 3GPP Mobile Competence Centre, 650, Route Des Lucioles, F-06921 Sophia-Antipolis Cedex, France, vol. SA WG2, No. V16.0.0, Dec. 19, 2018, pp. 1-107, XP051591219, Clause 6.14.3.3, 6.15.3.1, 6.22.3.1, Figures 6.14.3.3-1, 6.15.3-1, 6.15.3-2.
International Search Report and Written Opinion—PCT/US2022/046847—ISA/EPO—Jan. 18, 2023.

* cited by examiner

*Primary Examiner* — Adolf Dsouza
(74) *Attorney, Agent, or Firm* — Harrity & Harrity, LLP

(57) ABSTRACT

A radio access network (RAN) node may transmit, to an access and mobility function (AMF) of a core network, a request associated with a location-based state of a user equipment (UE) served by the RAN node. The location-based state of the UE may be associated with whether the UE is flying or whether the UE is driving, or other location information of the UE. Accordingly, the RAN node may receive a message in response to the request. The RAN node may receive the message in response to the request from the AMF. Alternatively, the AMF may establish a connection between the RAN node and a location management function (LMF) of the core network such that the RAN node receives the message in response to the request from the LMF.

35 Claims, 22 Drawing Sheets

DETERMINING, AT A RADIO ACCESS NETWORK NODE, A LOCATION-BASED STATE OF A USER EQUIPMENT

INTRODUCTION

Aspects of the present disclosure generally relate to wireless communication and to techniques and apparatuses associated with location-based states of user equipment (UEs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a UE or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a radio access network (RAN) node. The method may include transmitting, to an access and mobility function (AMF) of a core network, a request associated with a location-based state of a user equipment (UE) served by the RAN node. The method may further include receiving a message in response to the request.

Some aspects described herein relate to a method of wireless communication performed by an AMF of a core network. The method may include receiving, from a RAN node, a request associated with a location-based state of a UE served by the RAN node. The method may further include transmitting a message in response to the request.

Some aspects described herein relate to a method of wireless communication performed by a location management function (LMF) of a core network. The method may include receiving, from an AMF of the core network, a request including a parameter associated with a location-based state of a UE served by a RAN node. The method may further include performing at least one positioning measurement on the UE based on the request.

Some aspects described herein relate to an apparatus for wireless communication at a RAN node. The apparatus may include a memory and one or more processors coupled to the memory. The memory and the one or more processors may be configured to transmit, to an AMF of a core network, a request associated with a location-based state of a UE served by the RAN node. The memory and the one or more processors may be further configured to receive a message in response to the request.

Some aspects described herein relate to an apparatus for wireless communication at an AMF of a core network. The apparatus may include a memory and one or more processors coupled to the memory. The memory and the one or more processors may be configured to receive, from a RAN node, a request associated with a location-based state of a UE served by the RAN node. The memory and the one or more processors may be further configured to transmit a message in response to the request.

Some aspects described herein relate to an apparatus for wireless communication at an LMF of a core network. The apparatus may include a memory and one or more processors coupled to the memory. The memory and the one or more processors may be configured to receive, from an AMF of the core network, a request including a parameter associated with a location-based state of a UE served by a RAN node. The memory and the one or more processors may be further configured to perform at least one positioning measurement on the UE based on the request.

Some aspects described herein relate to a non-transitory computer-readable medium that stores a set of instructions for wireless communication by a RAN node. The set of instructions, when executed by one or more processors of the RAN node, may cause the RAN node to transmit, to an AMF of a core network, a request associated with a location-based state of a UE served by the RAN node. The set of instructions, when executed by one or more processors of the RAN node, may further cause the RAN node to receive a message in response to the request.

Some aspects described herein relate to a non-transitory computer-readable medium that stores a set of instructions for wireless communication by an AMF of a core network. The set of instructions, when executed by one or more processors of the AMF, may cause the AMF to receive, from a RAN node, a request associated with a location-based state of a UE served by the RAN node. The set of instructions, when executed by one or more processors of the AMF, may further cause the AMF to transmit a message in response to the request.

Some aspects described herein relate to a non-transitory computer-readable medium that stores a set of instructions for wireless communication by an LMF of a core network. The set of instructions, when executed by one or more processors of the LMF, may cause the LMF to receive, from an AMF of the core network, a request including a parameter associated with a location-based state of a UE served by a RAN node. The set of instructions, when executed by one or more processors of the LMF, may further cause the LMF to perform at least one positioning measurement on the UE based on the request.

Some aspects described herein relate to an apparatus for wireless communication. The apparatus may include means for transmitting, to an AMF of a core network, a request associated with a location-based state of a UE served by the apparatus. The apparatus may further include means for receiving a message in response to the request.

Some aspects described herein relate to an apparatus for wireless communication. The apparatus may include means for receiving, from a RAN node, a request associated with a location-based state of a UE served by the RAN node. The apparatus may further include means for transmitting a message in response to the request.

Some aspects described herein relate to an apparatus for wireless communication. The apparatus may include means for receiving, from an AMF of a core network, a request including a parameter associated with a location-based state of a UE served by a RAN node. The apparatus may further include means for performing at least one positioning measurement on the UE based on the request.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
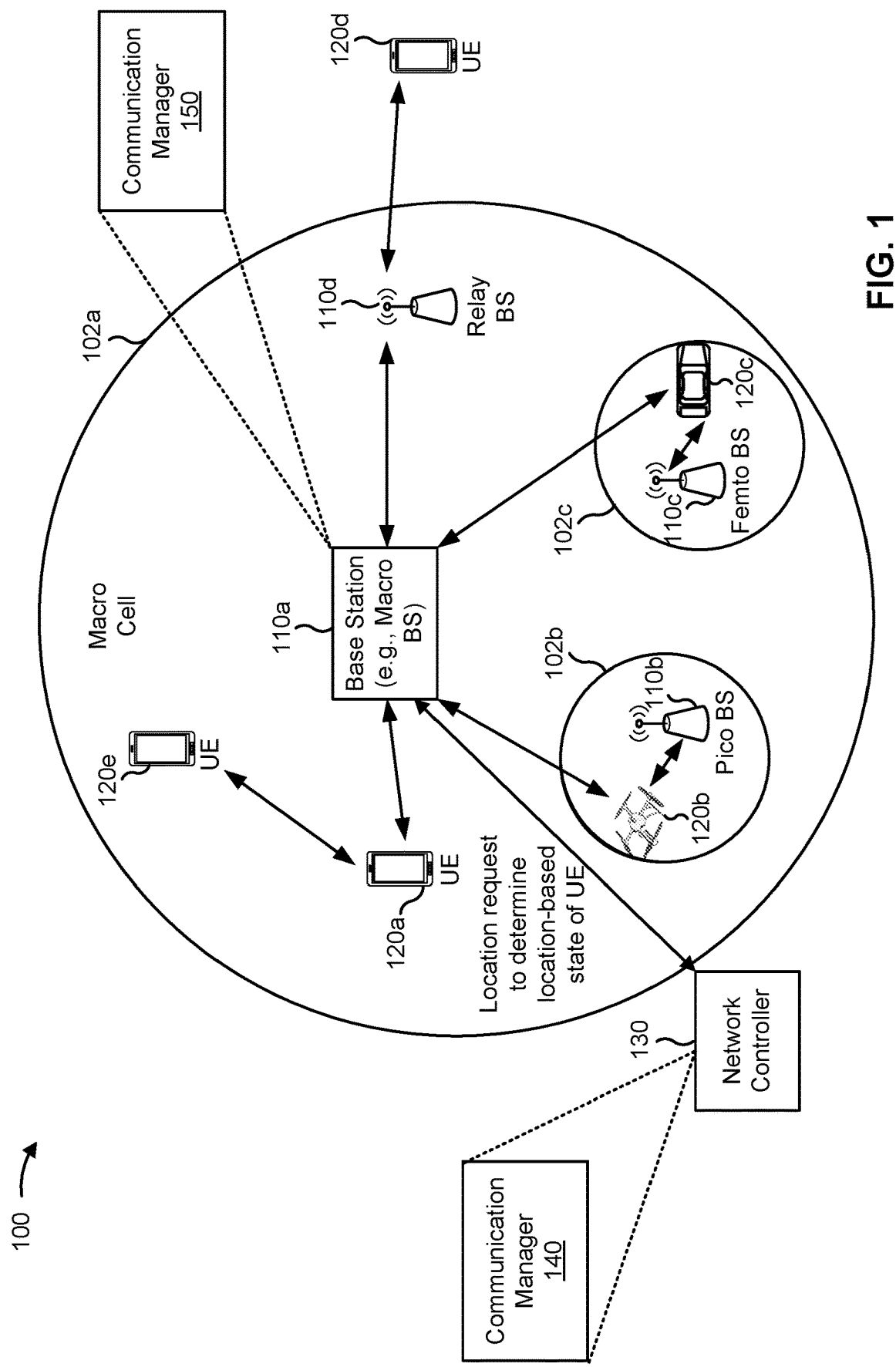
FIG. 1 is a diagram illustrating an example of a wireless network, in accordance with the present disclosure.

In some situations, a radio access network (RAN) node (e.g., a 5G RAN node, such as a base station) may provide different services to a user equipment (UE) depending on a location-based state of the UE. As used herein, "location-based state" refers to a state, associated with a UE, that is based on a current location of the UE and at least one of a past location of the UE or a future (e.g., predicted) location of the UE. Examples of a location-based state include whether a UE is flying, whether a UE is driving, whether a UE is stationary on the ground, whether a UE is stationary at an altitude (e.g., in a building), or whether a UE is on a boat or other aquatic vehicle, among other examples.

In one example, the RAN node may provide data services to an aerial UE ("aerial" referring to a drone and/or another unmanned aerial vehicle (UAV)) while the aerial UE is flying but disallow data services to a terrestrial UE ("terrestrial" referring to a mobile phone and/or another UE intended for handheld use) while the terrestrial UE is flying (e.g., when the terrestrial UE is on a plane, on a helicopter, on a drone, or otherwise on a flying vehicle). In another example, the RAN node may allocate different frequency resources to terrestrial UEs (e.g., shorter range radio waves) as compared with aerial UEs (e.g., longer range radio waves). Additionally, the RAN node may allocate different resources to an aerial UE when the UE is flying as compared with when the UE is on the ground.

However, terrestrial UEs and aerial UEs may have similar reference signal received power (RSRP) values, timing advance (TA) values, and/or other parameters that can be measured by a RAN node. For example, a terrestrial UE that has an altitude on account of being within a building may have similar measurements as an aerial UE that is actively flying. Similarly, an aerial UE that is flying may have similar measurements as an aerial UE that is on the ground.

In another example, the RAN node may provide data services to a vehicle UE ("vehicle" referring to a device that can propel itself over land or water) while the vehicle UE is driving but disallow data services to a vehicle UE while the vehicle UE is stationary. In another example, the RAN node may allocate different frequency resources to terrestrial UEs (e.g., shorter range radio waves) as compared with vehicle UEs (e.g., longer range radio waves). Additionally, the RAN node may allocate different resources to a terrestrial UE when the UE is moving (e.g., when the terrestrial UE is in a car or otherwise in a driving vehicle) as compared with when a vehicle UE is moving.

However, vehicle UEs and terrestrial UEs may have similar RSRP values, TA values, and/or other parameters that can be measured by a RAN node. For example, a terrestrial UE that is with a person in a moving vehicle may have similar measurements as a vehicle UE that is actively driving. Similarly, a vehicle UE that is driving may have similar measurements as an aerial UE that is flying lower to the ground.

Furthermore, the RAN node may request that a UE indicate its position to the RAN node, but the UE may spoof its location in response. As used herein, "spoof" refers to when the UE reports an inaccurate location and/or velocity to the RAN node. Accordingly, the RAN node may be unable to accurately determine location-based states for UEs.

Some techniques and apparatuses described herein allow a RAN node to request measurements from a location management function (LMF) (or another similar entity that perform locating functions) of a core network via an access and mobility function (AMF) (or another similar entity that perform mobility functions) of the core network. The RAN node may therefore use the measurements to determine a location-based state of a UE. Alternatively, the LMF or the AMF may determine the location-based state of the UE and indicate the location-based state to the RAN node. As a result, the RAN node may allocate network resources that improve performance (e.g., by provisioning more resources to a flying UE or driving UE such that quality and reliability are increased or by provisioning fewer resources to a non-flying UE and/or non-flying UE to reduce network overhead). Additionally, the RAN node may conserve power and processing resources by not provisioning network resources to a UE when the UE should not receive service (e.g., when a terrestrial UE is flying, when an aerial UE is on the ground, or when a vehicle UE is stationary).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a RAN node (e.g., the base station 110) may include a communication manager 150. As described in more detail elsewhere herein, the communication manager 150 request information from a core network (e.g., including the network controller 130) associated with a location-based state of a UE (e.g., the UE 120). The communication manager 150 may transmit (e.g., to an AMF of the core network) a request associated with the location-based state of the UE 120 served by the RAN node and receive a message in response to the request. Additionally, or alternatively, the communication manager 150 may perform one or more other operations described herein.

In some aspects, the core network may include a communication manager 140. The communication manager 140 may be associated with an AMF, and as described in more detail elsewhere herein, the communication manager 140 may receive (e.g., from a RAN node) a request associated with a location-based state of the UE 120 served by the RAN node and transmit a message in response to the request. Alternatively, the communication manager 140 may be associated with an LMF, and as described in more detail elsewhere herein, the communication manager 140 may receive (e.g., from an AMF) a request including a parameter associated with a location-based state of the UE 120 served by a RAN node and perform at least one positioning measurement on the UE 120 based on the request. Additionally, or alternatively, the communication manager 140 may perform one or more other operations described herein.

As indicated above, FIG. 1 is provided as an example. Other examples may differ from what is described with regard to FIG. 1.

Figure 2:
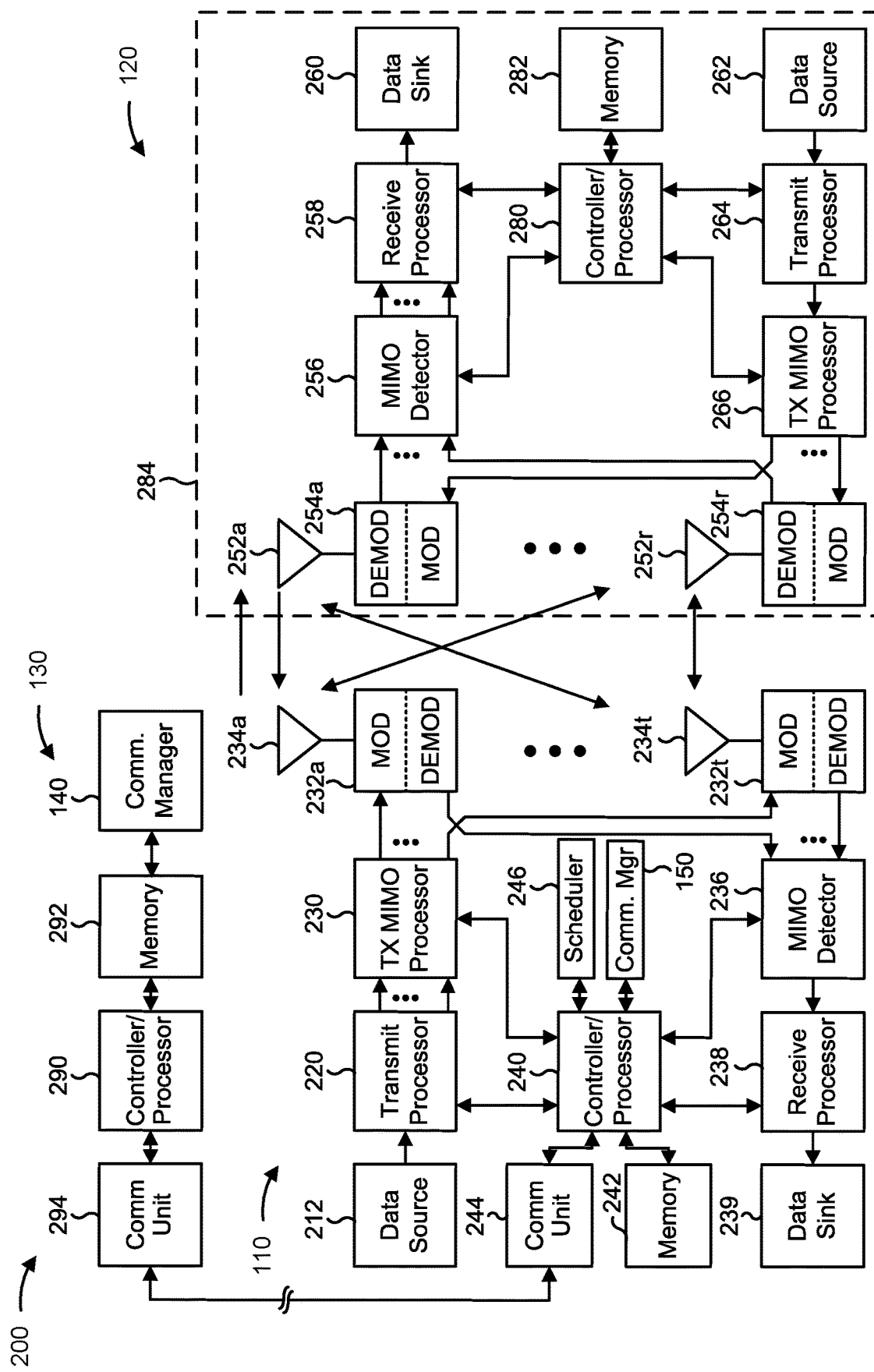
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T>1). The UE 120 may be equipped with a set of antennas 252a through 252r, such as R antennas (R>1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a RSRP parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with determining location-based states of a UE, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples. In some aspects, the RAN node described herein is the base station 110, is included in the base station 110, or includes one or more components of the base station 110 shown in FIG. 2. In some aspects, the AMF and/or the LMF described herein is the network controller 130, is included in the network controller 130, or includes one or more components of the network controller 130 shown in FIG. 2.

In some aspects, a RAN node may include means for transmitting, to an AMF of a core network, a request associated with a location-based state of a UE served by the RAN node; and/or means for receiving a message in response to the request. In some aspects, the means for the RAN node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an AMF of a core network may include means for receiving, from a RAN node, a request associated with a location-based state of a UE served by the RAN node; and/or means for transmitting a message in response to the request. In some aspects, the means for the AMF to perform operations described herein may include, for example, one or more of communication manager 140, controller/processor 290, memory 292, or communication unit 294.

In some aspects, the LMF may include means for receiving, from an AMF of the core network, a request including a parameter associated with a location-based state of a UE served by a RAN node; and/or means for performing at least one positioning measurement on the UE based on the request. In some aspects, the means for the LMF to perform operations described herein may include, for example, one or more of communication manager 140, controller/processor 290, memory 292, or communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
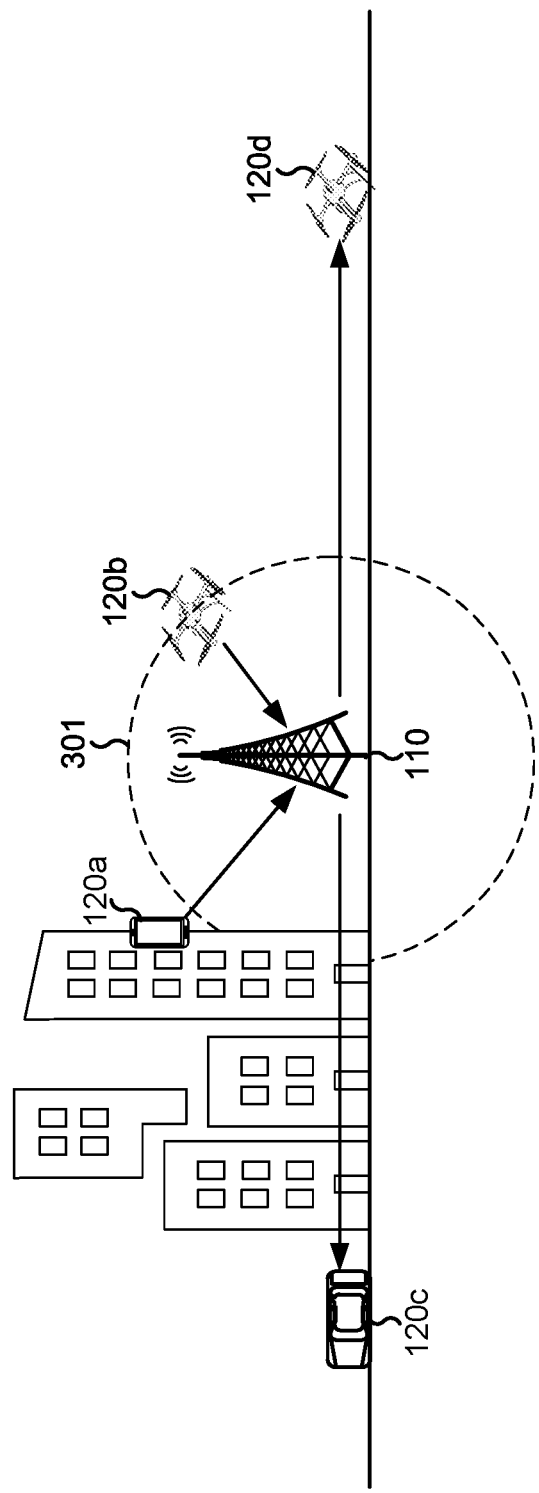
FIGS. 3A and 3B are a diagram illustrating an example of location-based states for UEs, in accordance with the present disclosure.
Figure 3B:
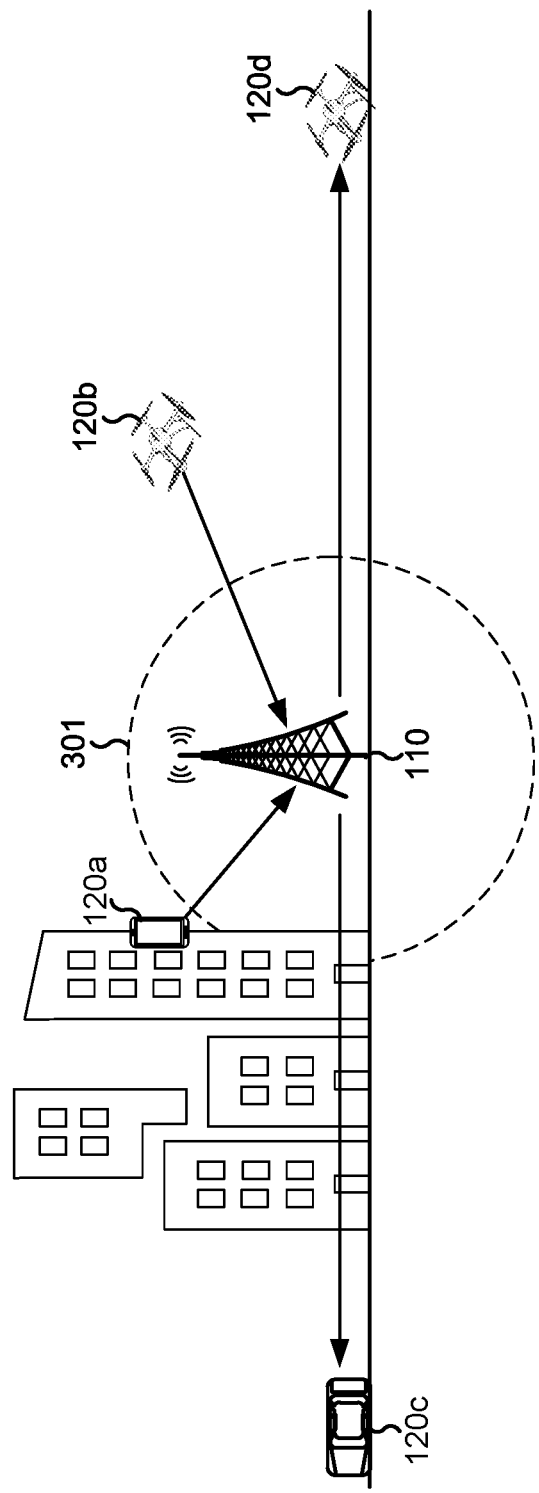

FIGS. 3A and 3B are a diagram illustrating an example 300 of location-based states for UEs, in accordance with the present disclosure. As shown in FIGS. 3A and 3B, UE 120*a* is a terrestrial UE that is at an altitude because the UE 120*a* is within a higher floor of a building. Accordingly, a location-based state of the UE 120*a*, based on a past location (shown in FIG. 3A) and a current location (shown in FIG. 3B) of the UE 120*a*, may characterize the UE 120*a* as at a stationary height. Additionally, UE 120*b* is an aerial UE that is at an altitude because the UE 120*b* is flying. Accordingly, a location-based state of the UE 120*b*, based on a past location (shown in FIG. 3A) and a current location (shown in FIG. 3B) of the UE 120*b*, may characterize the UE 120*b* as flying.

As shown by reference number 301, the UE 120a and the UE 120b are at a same (or at least similar within a threshold) distance from a gNB 110. Accordingly, the gNB 110 may determine a same (or at least similar within a threshold) value for an RSRP (e.g., associated with a downlink reference signal, such as a channel state information reference signal (CSI-RS), and/or associated with an uplink reference signal, such as a sounding reference signal (SRS)), a TA, and/or another similar parameter for the UE 120a as for the UE 120b. Accordingly, in example 300, the gNB 110 is unable to determine which, if any, of the UE 120a and the UE 120b are flying.

As further shown in FIGS. 3A and 3B, UE 120c is a vehicle UE that is moving because the UE 120c is driving. Accordingly, a location-based state of the UE 120c, based on a past location (shown in FIG. 3A) and a current location (shown in FIG. 3B) of the UE 120c, may characterize the UE 120c as driving. Additionally, UE 120d is an aerial UE that is moving because the UE 120d is flying. Accordingly, a location-based state of the UE 120d, based on a past location (shown in FIG. 3A) and a current location (shown in FIG. 3B) of the UE 120d, may characterize the UE 120d as flying.

The UE 120c and the UE 120d are moving at a same (or at least similar within a threshold) velocity relative to the gNB 110. Additionally, because the UE 120d is flying close to the ground, the UE 120c and the UE 120d are at a same (or at least similar within a threshold) altitude. Accordingly, the gNB 110 may determine a same (or at least similar within a threshold) value for an RSRP, a TA, and/or another similar parameter for the UE 120c as for the UE 120d. Accordingly, in example 300, the gNB 110 is unable to determine whether the UE 120c is flying or driving and whether the UE 120d is flying or driving.

Other examples where the gNB 110 is unable to determine which, if any, of the UE 120a and the UE 120b are flying may include a situation when the UE 120a and the UE 120b are both on or near the ground. Similarly, other examples may include the gNB 110 being unable to determine which, if any, of the UE 120a and the UE 120c are driving.

A RAN node (e.g., a 5G RAN node, such as a gNB) may provide different services to a UE based on a location-based state of the UE. However, as described above, the RAN node may be unable to determine the location-based state for a UE. Some techniques and apparatuses described herein allow a RAN node (e.g., RAN node 110) to request measurements from an LMF (e.g., LMF 503, depicted in FIG. 5) of a core network via an AMF (e.g., AMF 501, depicted in FIG. 5) of the core network. The RAN node 110 may therefore use the measurements to determine a location-based state of a UE (e.g., UE 120). Alternatively, the LMF 503 or the AMF 501 may make the determination and indicate the location-based state to the RAN node 110. As a result, the RAN node 110 may allocate network resources that improve performance (e.g., by provisioning more resources to a flying UE such that quality and reliability are increased, or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

As indicated above, FIG. 3 is provided as an example. Other examples may differ from what is described with respect to FIG. 3.

Figure 4:
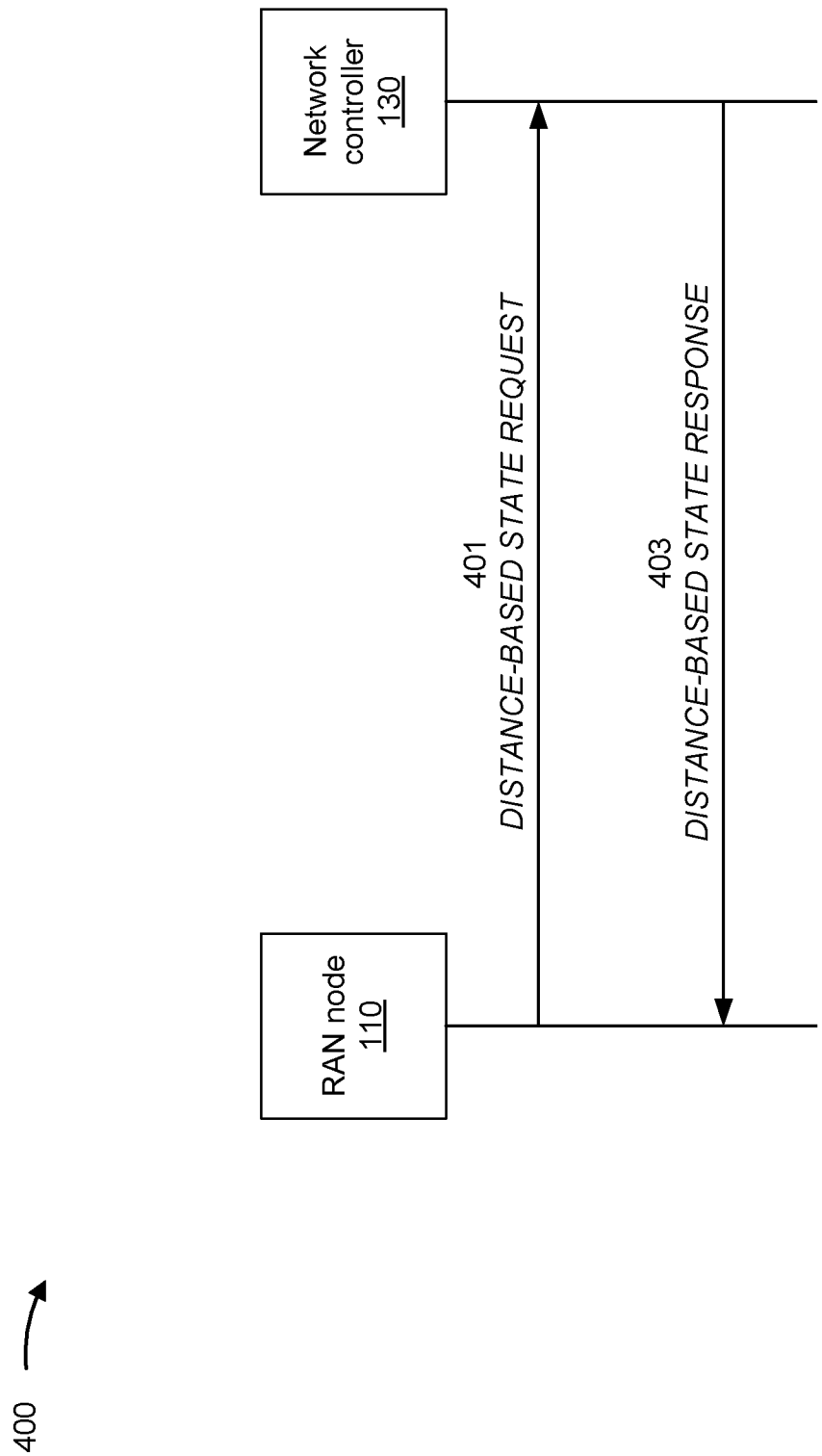
FIGS. 4, 5, and 6 are diagrams illustrating examples associated with determining a location-based state of a UE using a location management function (LMF) selection request, in accordance with the present disclosure.

FIG. 4 is a diagram illustrating an example 400 associated with determining a location-based state of a UE using an LMF selection request, in accordance with the present disclosure. As shown in FIG. 4, a RAN node 110 may communicate with a core network (e.g., on a wired and/or wireless backhaul) including at least a network controller 130. The core network may include an AMF and an LMF, as described in connection with FIGS. 5 and 6. Additionally, the RAN node 110 may serve a UE (e.g., over-the-air (OTA)).

In some aspects, the RAN node 110 may transmit, and the network controller 130 may receive, a request associated with a location-based state of the UE served by the RAN node. For example, as shown by reference number 401, the RAN node 110 may use a DISTANCE-BASED STATE REQUEST message (e.g., to be defined in 3GPP specifications) to request that the core network perform measurements associated with locating the UE (e.g., using a plurality of base stations such that the UE may be triangulated). Although described as a DISTANCE-BASED STATE REQUEST message, the RAN node 110 may transmit the request to obtain a different location-based state of the UE, such as whether the UE is driving or whether the UE is on an aquatic vehicle. As described in connection with FIGS. 5 and 6, the request may be encapsulated as an LMF selection request. Additionally, the request may further include an NR positioning protocol A (NRPPa) message associated with the location-based state of the UE.

Accordingly, the network controller 130 may perform a UE positioning technique. For example, the network controller 130 may coordinate a triangulation procedure using a plurality of base stations (which may include the RAN node 110). In another example, the network controller 130 may additionally or alternatively use global navigation satellite system (GNSS) and/or global positioning system (GPS) methods. The network controller 130 may additionally or alternatively use network assistance (e.g., using WiFi measurements and/or measurements from other wireless networks). In some aspects, the network controller 130 may determine a velocity in addition to a position associated with the UE.

Additionally, the network controller 130 may transmit, and the RAN node 110 may receive, a message in response to the request. For example, as shown by reference number 403, the RAN node 110 may use a DISTANCE-BASED STATE RESPONSE message (e.g., to be defined in 3GPP specifications). Although described as a DISTANCE-BASED STATE RESPONSE message, the network controller 130 may transmit a message associated with a different location-based state of the UE, such as whether the UE is driving or whether the UE is on an aquatic vehicle. As described in connection with FIG. 5, the message in response to the request may be received from an AMF of the network controller 130. Alternatively, and as described in connection with FIG. 6, the message in response to the request may be received from an LMF of the network controller 130. The message in response to the request may be encapsulated as an NRPPa message.

In some aspects, the message in response to the request may indicate the location-based state of the UE, such as whether the UE is flying or driving. For example, the message in response to the request may include a Boolean (e.g., set to TRUE for flying and FALSE for not-flying), a bit (e.g., set to 1 for flying and 0 for not-flying), and/or another type of data structure that indicates whether the UE is flying or not, whether the UE is driving or not, and/or another location-based state of the UE. Additionally, or alternatively, the message in response to the request may include measurements performed by the network controller 130. For example, the message in response to the request may include raw measurements (e.g., signal strength measurements at the UE associated with reference signals transmitted from and/or to the plurality of base stations) and/or derived measurements (e.g., a position and velocity associated with the UE) such that the RAN node 110 determines the location-based state of the UE using the measurements included in the message in response to the request. For example, the RAN node 110 may determine that the UE is flying (or driving) based on a change in signal strength over time that satisfies a threshold, a velocity associated with the UE that satisfies a threshold, and/or a position associated with the UE that satisfies a threshold, among other examples.

By using techniques as described in connection with FIG. 4, the RAN node 110 can request measurements from the core network to determine a location-based state of the UE. As a result, the RAN node 110 may allocate network resources that improve performance (e.g., by provisioning more resources to a flying UE such that quality and reliability are increased or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

As indicated above, FIG. 4 is provided as an example. Other examples may differ from what is described with respect to FIG. 4.

Figure 5:
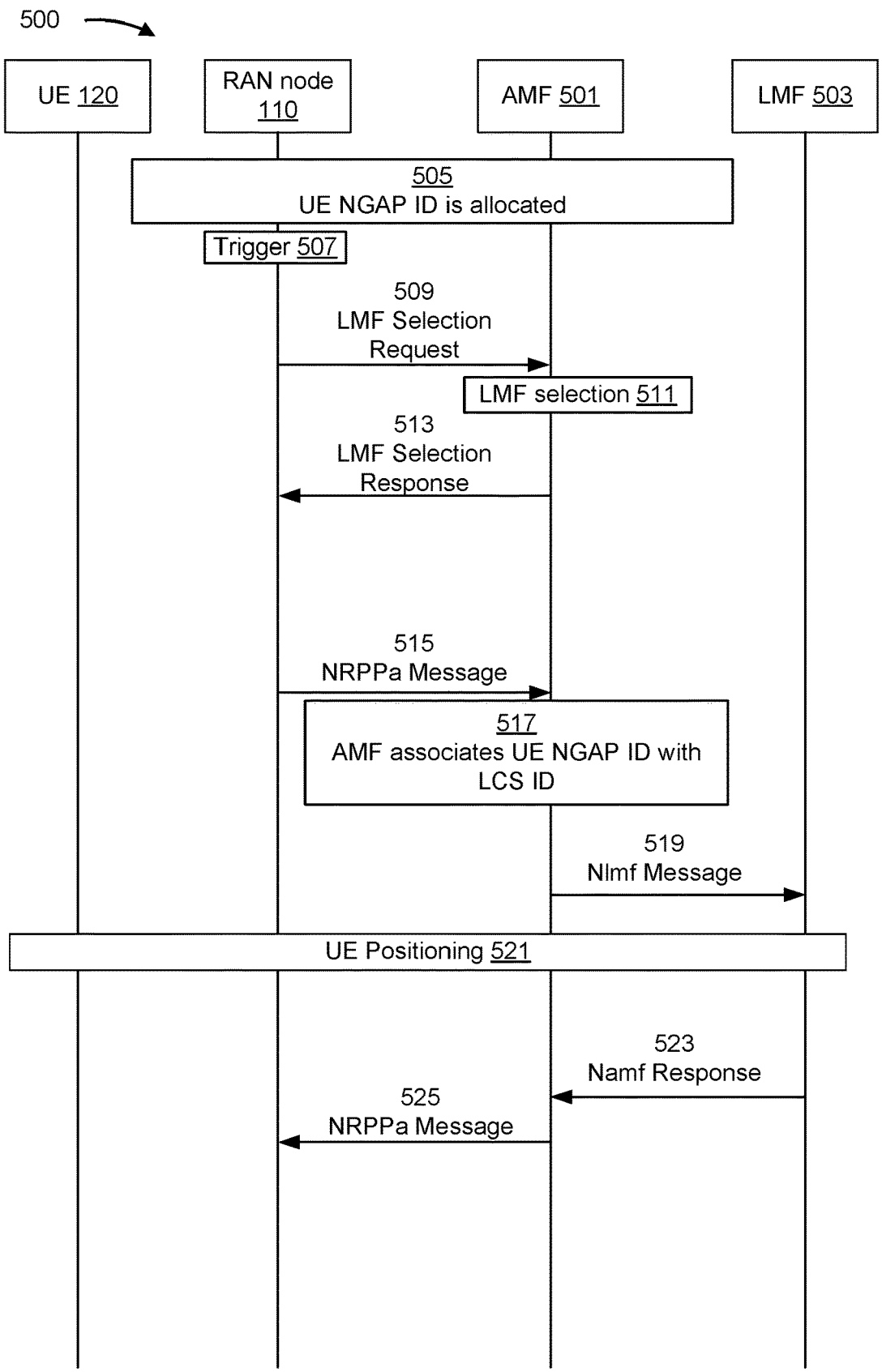

FIG. 5 is a diagram illustrating an example 500 associated with determining a location-based state of a UE using an LMF selection request, in accordance with the present disclosure. As shown in FIG. 5, a RAN node 110 may communicate with a core network (e.g., on a wired and/or wireless backhaul). As shown in FIG. 5, the core network may include an AMF 501 and an LMF 503. Additionally, the RAN node 110 may serve a UE 120 (e.g., OTA).

As shown by reference number 505, the AMF 501 may allocate an identifier to the UE 120 when the UE 120 connects to the RAN node 110 and is assigned to the AMF 501. In example 500, the identifier comprises a UE NGAP identifier (UE NGAP ID).

As shown by reference number 507, the RAN node 110 may detect a trigger condition. For example, the RAN node 110 may determine to request that the LMF 503 assist in determining a location-based state of the UE 120 in order to allocate network resources to the UE 120 accordingly. In some aspects, the RAN node 110 may use a TA value, one or more RSRP values, a MIMO technique, and/or additional measurements to try to detect whether the UE 120 is flying. Accordingly, the RAN node 110 may determine to request that the LMF 503 assist in determining the location-based state of the UE 120 when measurements taken by the RAN node 110 (as described above) are inconclusive (e.g., do not satisfy a threshold by a significant amount and/or result in conflicting determinations, among other examples). Additionally, or alternatively, the RAN node 110 may determine to request that the LMF 503 assist in determining the location-based state of the UE 120 when the UE 120 indicates (e.g., in a capability message) that the UE 120 is an aerial UE, a vehicle UE, and/or another type of UE. Similarly, the RAN node 110 may determine to request that the LMF 503 assist in determining the location-based state of the UE 120 when the UE 120 indicates (e.g., in a capability message) that the UE 120 is a terrestrial UE, but measurements taken by the RAN node 110 (as described above) suggest that the UE 120 is flying or driving.

Accordingly, the RAN node 110 may transmit, and the AMF 501 may receive, a request associated with a location-based state of the UE 120 served by the RAN node 110. For example, as shown by reference number 509, the RAN node 110 may use an LMF selection request (e.g., included in an NGAP message) to request that the AMF 501 select an LMF to use for determining the location-based state of the UE 120. The request may therefore include at least the identifier associated with the UE 120 (e.g., the UE NGAP ID).

As shown by reference number 511, the AMF 501 may select the LMF 503 to perform UE positioning for the UE 120. Accordingly, as shown by reference number 513, the AMF 501 may transmit, and the RAN node 110 may receive, an LMF selection response (e.g., included in an NGAP message). The LMF selection response may include a routing identifier (ID) associated with the LMF 503 selected by the AMF 501 (and may additionally include the identifier associated with the UE 120, such as the UE NGAP ID).

Accordingly, as shown by reference number 515, the RAN node 110 may transmit, and the AMF 501 may receive, an NR positioning protocol A (NRPPa) message associated with the location-based state of the UE 120. The NRPPa message may include the routing ID associated with the LMF 503 selected by the AMF 501 and the identifier associated with the UE 120, such as the UE NGAP ID. Additionally, the RAN node 110 may indicate a quantity of NRPP sessions (e.g., represented by N). Each NRPP session may be associated with a corresponding UE positioning performed by the LMF 503. Accordingly, the RAN node 110 may request more than one UE positioning in order to increase an accuracy of the determination of the location-based state of the UE 120.

As shown by reference number 517, the AMF 501 may associate the routing ID with a correlation ID for the location service (LCS) provided by the LMF 503. Accordingly, the AMF 501 routes NRPPa messages from the RAN node 110 that include the routing ID to the LMF 503 using the LCS correlation ID.

As shown by reference number 519, the AMF 501 may transmit, and the LMF 503 may receive, a network function LMF (Nlmf) service operation message. The Nlmf service operation message may include the NRPPa message from the RAN node 110. Additionally, the AMF 501 may include the LCS correlation ID and a UE identifier for the UE 120 (e.g., a subscription permanent identifier (SUPI) and/or a generic public subscription identifier (GPSI), among other examples).

Accordingly, as shown by reference number 521, the LMF 503 may perform at least one positioning measurement on the UE 120 based on the Nlmf service operation message. For example, the LMF 503 may instruct a plurality of base stations to perform measurements on the UE 120 (as identified using the SUPI, the GPSI, and/or another similar identifier indicated by the AMF 501).

As shown by reference number 523, the LMF 503 may transmit, and the AMF 501 may receive, a network function AMF (Namf) message in response to the Nlmf service operation message. The Namf message may include an NRPPa message from the LMF 503. In some aspects, the LMF 503 may determine the location-based state of the UE 120 such that the NRPPa message includes an indication of the location-based state. Additionally, or alternatively, the NRPPa message may include measurement values from the at least one positioning measurement. The Namf message may further include the LCS correlation ID.

Accordingly, as shown by reference number 525, the AMF 501 may transmit, and the RAN node 110 may receive, an NRPPa message associated with the location-based state of the UE 120. The NRPPa message may include the routing ID associated with the LMF 503 and the identifier associated with the UE 120, such as the UE NGAP ID.

By using techniques as described in connection with FIG. 5, the RAN node 110 can request measurements from the LMF 503 via the AMF 501 to determine a location-based state of the UE 120. As a result, the RAN node 110 may allocate network resources that improve performance (e.g., by provisioning more resources to a flying UE such that quality and reliability are increased, or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

As indicated above, FIG. 5 is provided as an example. Other examples may differ from what is described with respect to FIG. 5.

Figure 6:
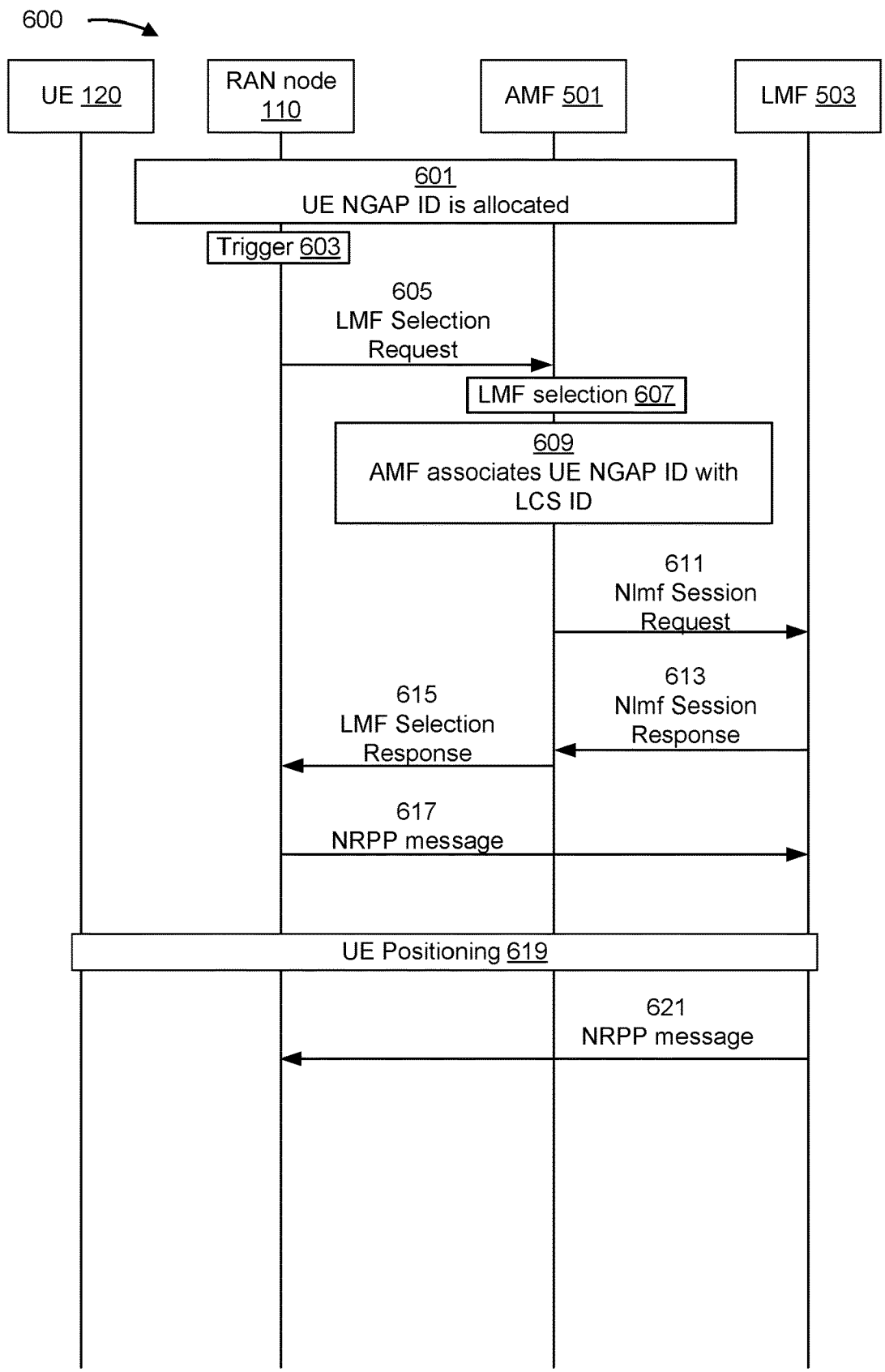

FIG. 6 is a diagram illustrating an example 600 associated with determining a location-based state of a UE using an LMF selection request, in accordance with the present disclosure. As shown in FIG. 6, a RAN node 110 may communicate with a core network (e.g., on a wired and/or wireless backhaul). As shown in FIG. 6, the core network may include an AMF 501 and an LMF 503. Additionally, the RAN node 110 may serve a UE 120 (e.g., OTA).

As shown by reference number 601, the AMF 501 may allocate an identifier to the UE 120 when the UE 120 connects to the RAN node 110 and is assigned to the AMF 501. In example 600, the identifier comprises a UE NGAP ID.

As shown by reference number 603, the RAN node 110 may detect a trigger condition. For example, the RAN node 110 may detect a trigger condition as described above in connection with reference number 507 of FIG. 5.

Accordingly, the RAN node 110 may transmit, and the AMF 501 may receive, a request associated with a location-based state of the UE 120 served by the RAN node 110. For example, as shown by reference number 605, the RAN node 110 may use an LMF selection request (e.g., included in an NGAP message) to request that the AMF 501 select an LMF to use for determining the location-based state of the UE 120. The request may therefore include at least the identifier associated with the UE 120 (e.g., the UE NGAP ID).

As shown by reference number 607, the AMF 501 may select the LMF 503 to perform UE positioning for the UE 120. In order to permit the RAN node 110 to communicate directly with the LMF 503, and as shown by reference number 609, the AMF 501 may associate a routing ID associated with the LMF 503 with a correlation ID for the LCS provided by the LMF 503.

Further, the AMF 501 may transmit, and the LMF 503 may receive, a session request. For example, as shown by reference number 611, the AMF 501 may use an Nlmf session request message to request that the LMF 503 provision a communication session for the RAN node 110. The AMF 501 may include the LCS correlation ID and a UE identifier for the UE 120 (e.g., a SUPI and/or a GPSI, among other examples).

As shown by reference number 613, the LMF 503 may transmit, and the AMF 501 may receive, an Nlmf session response message. The LMF selection response may include a routing ID associated with the LMF 503 selected by the AMF 501 and additionally an identifier associated with the UE 120 and used by the LMF 503, such as a UE measurement ID.

Accordingly, as shown by reference number 615, the AMF 501 may transmit, and the RAN node 110 may receive, an LMF selection response (e.g., included in an NGAP message). The LMF selection response may include a routing ID associated with the LMF 503 selected by the AMF 501 (and may additionally include the identifier associated with the UE 120, such as the UE NGAP ID). Additionally, the LMF selection response may include the UE measurement ID such that the RAN node 110 may communicate directly with the LMF 503 regarding the UE 120.

As shown by reference number 617, the RAN node 110 may transmit, and the LMF 503 may receive, an NRPPa message associated with the location-based state of the UE 120. The NRPPa message may include the routing ID associated with the LMF 503 selected by the AMF 501 and the UE measurement ID. Additionally, the RAN node 110 may indicate a quantity of NRPP sessions (e.g., represented by N). Each NRPP session may be associated with a corresponding UE positioning performed by the LMF 503. Accordingly, the RAN node 110 may request more than one UE positioning in order to increase an accuracy of the location-based state of the UE 120.

Accordingly, as shown by reference number 619, the LMF 503 may perform at least one positioning measurement on the UE 120 based on the NRPPa message. For example, the LMF 503 may instruct a plurality of base stations to perform measurements on the UE 120 (as identified using the UE measurement ID).

As shown by reference number 621, the LMF 503 may transmit, and the AMF 501 may receive, an NRPPa response. The NRPPa response may include the routing ID associated with the LMF 503 selected by the AMF 501 and the UE measurement ID. In some aspects, the LMF 503 may determine the location-based state of the UE 120 such that the NRPPa response includes an indication of the location-based state. Additionally, or alternatively, the NRPPa response may include measurement values from the at least one positioning measurement.

By using techniques as described in connection with FIG. 6, the RAN node 110 can request measurements from the LMF 503 to determine a location-based state of the UE 120. As a result, the RAN node 110 may allocate network resources that improve performance (e.g., by provisioning more resources to a flying UE such that quality and reliability are increased, or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

As indicated above, FIG. 6 is provided as an example. Other examples may differ from what is described with respect to FIG. 6.

Figure 7:
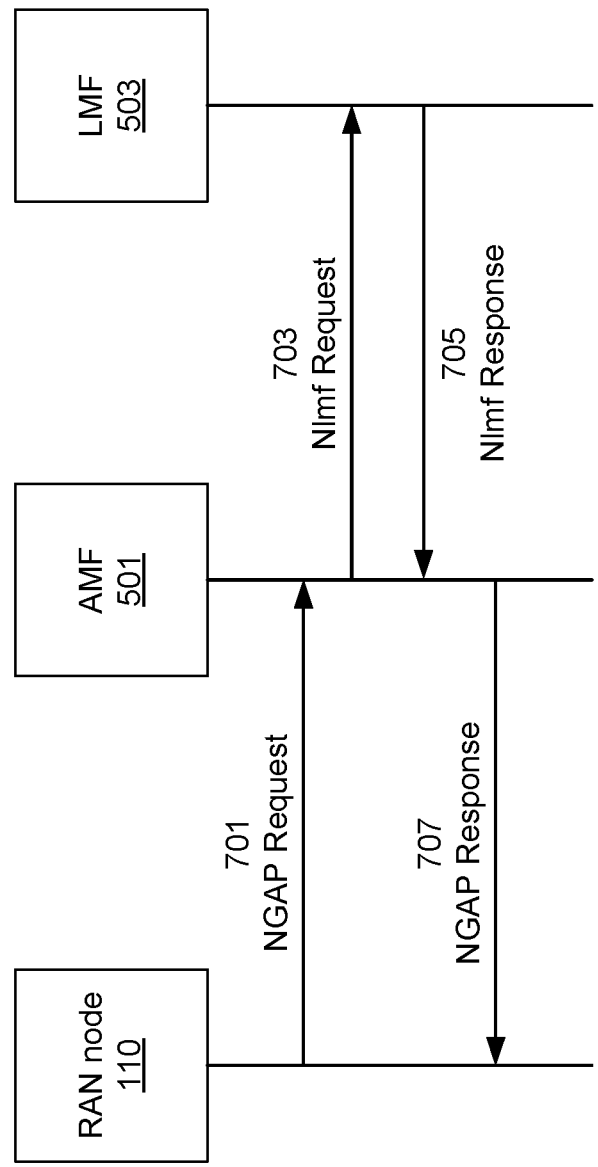
FIGS. 7 and 8 are diagrams illustrating examples associated with determining a location-based state of a UE using an NG application protocol (NGAP) positioning information request, in accordance with the present disclosure.

FIG. 7 is a diagram illustrating an example 700 associated with determining a location-based state of a UE using an NGAP positioning information request, in accordance with the present disclosure. As shown in FIG. 7, a RAN node 110 may communicate with a core network (e.g., on a wired and/or wireless backhaul). As shown in FIG. 7, the core network may include an AMF 501 and an LMF 503. Additionally, the RAN node 110 may serve a UE 120 (e.g., OTA).

In some aspects, the RAN node 110 may transmit, and the AMF 501 may receive, a request associated with a location-based state of the UE served by the RAN node. For example, as shown by reference number 701, the RAN node 110 may use an NGAP request (e.g., a positioning information request to be defined in 3GPP specifications) to request that the core network perform measurements associated with locating the UE (e.g., using a plurality of base stations such that the UE may be triangulated).

Accordingly, the AMF 501 may transmit, and the LMF 503 may receive, a request associated with a location-based state of the UE served by the RAN node. For example, as shown by reference number 703, the AMF 501 may use an Nlmf location request (e.g., including the NRPP request from the RAN node 110) to request that the core network perform measurements associated with locating the UE (e.g., using a plurality of base stations such that the UE may be triangulated).

Thus, the LMF 503 may perform a UE positioning technique. For example, the LMF 503 may perform a UE positioning technique as described in connection with FIG. 5.

Additionally, the LMF 503 may transmit, and the AMF 501 may receive, a message in response to the request. For example, as shown by reference number 705, the LMF 503 may use an Nlmf location response. In some aspects, the message in response to the request may indicate the location-based state of the UE. For example, the message in response to the request may include a Boolean (e.g., set to TRUE for flying and FALSE for not-flying), a bit (e.g., set to 1 for flying and 0 for not-flying), and/or another type of data structure that indicates whether the UE is flying or not, whether the UE is driving or not, and/or another location-based state of the UE. Additionally, or alternatively, the message in response to the request may include measurements performed by the LMF 503. For example, the message in response to the request may include raw measurements (e.g., signal strength measurements at the UE associated with reference signals transmitted from and/or to the plurality of base stations) and/or derived measurements (e.g., a position and velocity associated with the UE) such that the AMF 501 and/or the RAN node 110 determines the location-based state of the UE using the measurements included in the message in response to the request. For example, the AMF 501 and/or the RAN node 110 may determine that the UE is (or driving) based on a change in signal strength over time that satisfies a threshold, a velocity associated with the UE that satisfies a threshold, and/or a position associated with the UE that satisfies a threshold, among other examples.

Furthermore, the AMF 501 may transmit, and the RAN node 110 may receive, a message in response to the request. For example, as shown by reference number 707, the AMF 501 may use an NGAP response (e.g., a positioning information response to be defined in 3GPP specifications) to indicate the location-based state of the UE and/or the measurements from the LMF 503 to the RAN node 110.

By using techniques as described in connection with FIG. 7, the RAN node 110 can request measurements from the core network to determine a location-based state of the UE. As a result, the RAN node 110 may allocate network resources that improve performance (e.g., by provisioning more resources to a flying UE such that quality and reliability are increased, or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

As indicated above, FIG. 7 is provided as an example. Other examples may differ from what is described with respect to FIG. 7.

Figure 8:
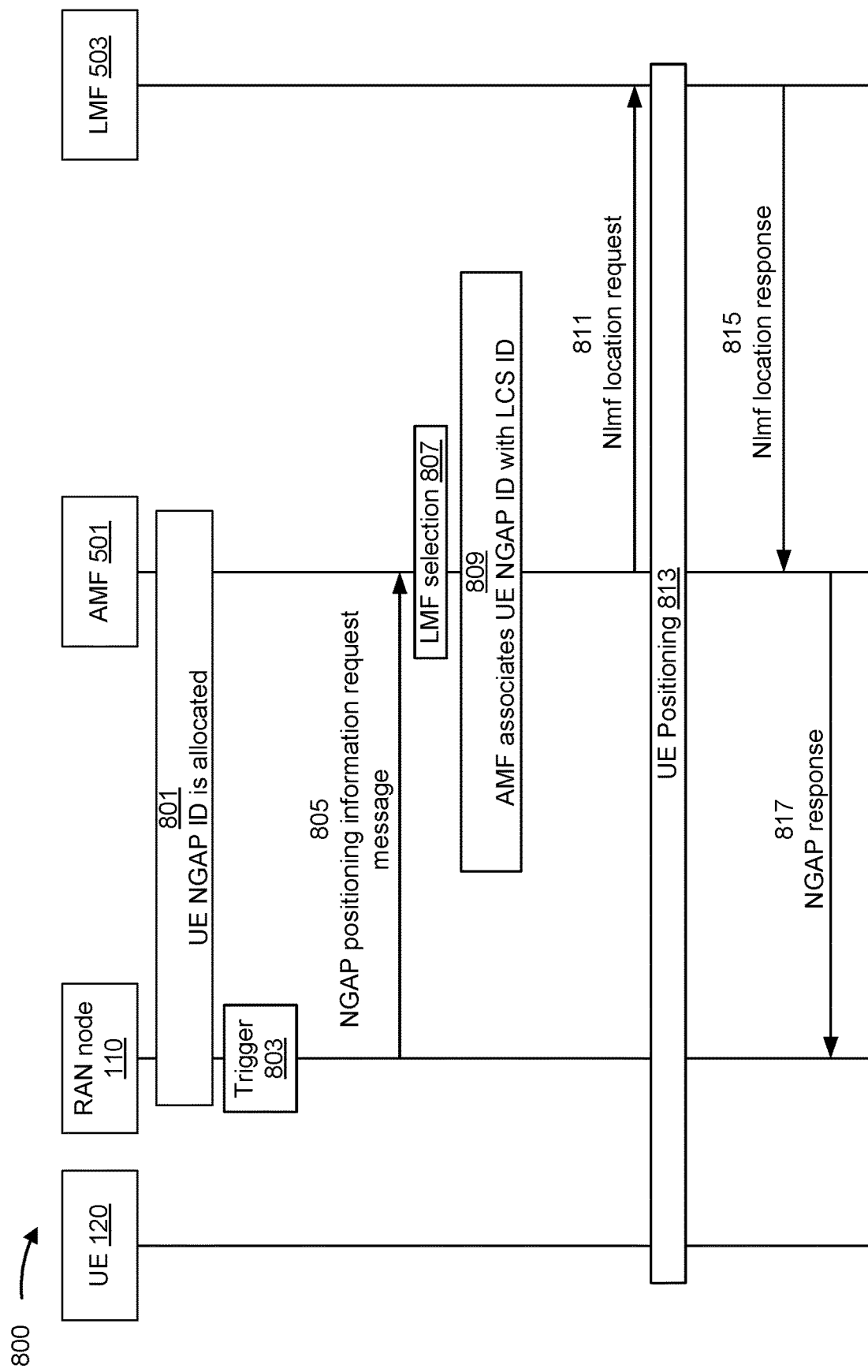

FIG. 8 is a diagram illustrating an example 800 associated with determining a location-based state of a UE using an NGAP positioning information request, in accordance with the present disclosure. As shown in FIG. 8, a RAN node 110 may communicate with a core network (e.g., on a wired and/or wireless backhaul). As shown in FIG. 8, the core network may include an AMF 501 and an LMF 503. Additionally, the RAN node 110 may serve a UE 120 (e.g., OTA).

As shown by reference number 801, the AMF 501 may allocate an identifier to the UE 120 when the UE 120 connects to the RAN node 110 and is assigned to the AMF 501. In example 800, the identifier comprises a UE NGAP ID.

As shown by reference number 803, the RAN node 110 may detect a trigger condition. For example, the RAN node 110 may detect a trigger condition as described in connection with reference number 507 of FIG. 5.

Accordingly, the RAN node 110 may transmit, and the AMF 501 may receive, a request associated with a location-based state of the UE 120 served by the RAN node 110. For example, as shown by reference number 805, the RAN node 110 may use an NGAP positioning information request to request that the AMF 501 select an LMF to use for determining the location-based state of the UE 120. The request may therefore include at least the identifier associated with the UE 120 (e.g., the UE NGAP ID). Additionally, the RAN node 110 may indicate a quantity of NRPP sessions (e.g., represented by N). Each NRPP session may be associated with a corresponding UE positioning performed by the LMF 503. Accordingly, the RAN node 110 may request more than one UE positioning in order to increase an accuracy of the location-based state of the UE 120.

As shown by reference number 807, the AMF 501 may select the LMF 503 to perform UE positioning for the UE 120. Additionally, as shown by reference number 809, the AMF 501 may associate a routing ID associated with the LMF 503 with a correlation ID for the LCS provided by the LMF 503.

Accordingly, as shown by reference number 811, the AMF 501 may transmit, and the LMF 503 may receive, an Nlmf location request. The Nlmf location request may include an NRPPa message extracted by the AMF 501 from the NGAP request from the RAN node 110. Additionally, the AMF 501 may include the LCS correlation ID and a UE identifier for the UE 120 (e.g., a SUPI and/or a GPSI, among other examples).

Accordingly, as shown by reference number 813, the LMF 503 may perform at least one positioning measurement on the UE 120 based on the Nlmf location request. For example, the LMF 503 may instruct a plurality of base stations to perform measurements on the UE 120 (as identified using the SUPI, the GPSI, and/or another similar identifier indicated by the AMF 501).

As shown by reference number 815, the LMF 503 may transmit, and the AMF 501 may receive, an Nlmf location response. The Nlmf location response may include an NRPPa message from the LMF 503. In some aspects, the LMF 503 may determine the location-based state of the UE 120 such that the NRPPa message includes an indication of the location-based state. Additionally, or alternatively, the NRPPa message may include measurement values from the at least one positioning measurement. The Nlmf location response may further include the LCS correlation ID.

Accordingly, as shown by reference number 817, the AMF 501 may transmit, and the RAN node 110 may receive, an NGAP message associated with the location-based state of the UE 120. For example, the NGAP message may encapsulate the NRPP message from the LMF 503. The NRPP message may include the routing ID associated with the LMF 503 and the identifier associated with the UE 120, such as the UE NGAP ID.

By using techniques as described in connection with FIG. 8, the RAN node 110 can request measurements from the LMF 503 via the AMF 501 to determine a location-based state of the UE 120. As a result, the RAN node 110 may allocate network resources that improve performance (e.g., by provisioning more resources to a flying UE such that quality and reliability are increased, or by provisioning fewer resources to a non-flying UE to reduce network overhead). Additionally, the RAN node 110 may conserve power and processing resources by not provisioning network resources to a UE when the UE should not receive service (e.g., when a terrestrial UE is flying or when an aerial UE is on the ground).

In some aspects, the RAN node 110 may determine whether to transmit a request, associated with a location-based state of the UE 120, encapsulated as an LMF selection request (e.g., as described in connection with FIGS. 4-6 or an NGAP positioning information request (e.g., as described in connection with FIGS. 7-8), based on one or more properties associated with the UE 120. For example, when the UE 120 is requesting a single service (such as an uplink transmission), the RAN node 110 may determine to use an NGAP positioning information request because the RAN node 110 will use the location-based state of the UE 120 at one time to determine whether to fulfil the request. In another example, when the UE 120 is requesting an ongoing service (such as a multimedia service or a voice call service), the RAN node 110 may determine to use an LMF selection request because the RAN node 110 may request measurements from the AMF 501 and the LMF 503 to periodically determine the location-based state of the UE 120 and determine whether to continue provisioning the ongoing service. Other properties of the UE 120 may be used, such as a type associated with the UE 120 (e.g., the RAN node 110 may determine to use an NGAP positioning information request when the UE 120 is a terrestrial UE but may determine to use an LMF selection request when the UE 120 is a flying UE or a driving UE) and/or subscription information associated with the UE 120 (e.g., the RAN node 110 may determine to use an NGAP positioning information request when the UE 120 is associated with a flying or driving subscription but may determine to use an LMF selection request when the UE 120 is associated with a terrestrial subscription), among other examples.

As indicated above, FIG. 8 is provided as an example. Other examples may differ from what is described with respect to FIG. 8.

Figure 9:
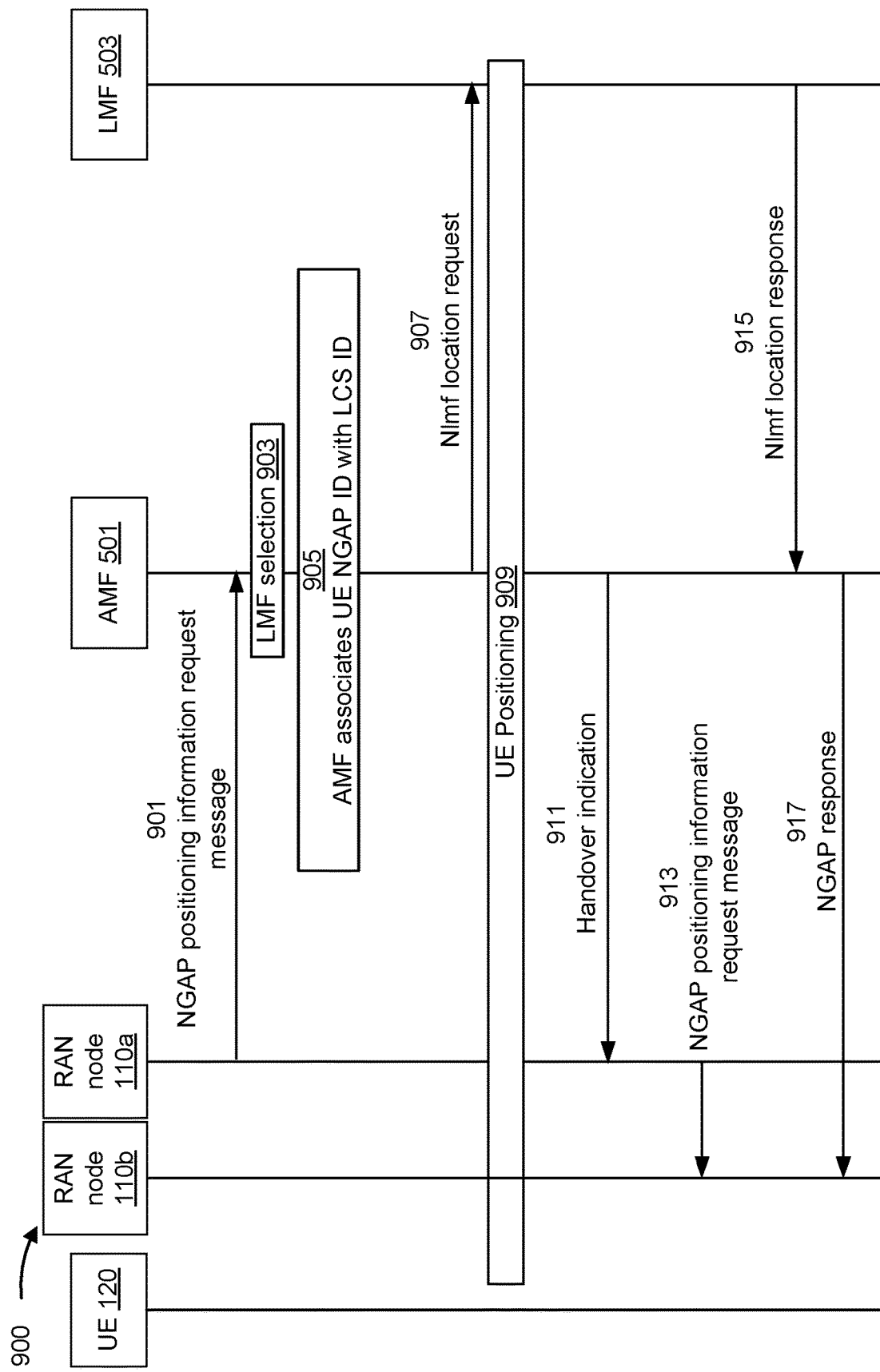
FIG. 9 is a diagram illustrating an example associated with determining a location-based state of a UE during handover, in accordance with the present disclosure.

FIG. 9 is a diagram illustrating an example 900 associated with determining a location-based state of a UE during a handover procedure, in accordance with the present disclosure. As shown in FIG. 9, a RAN node 110a and a RAN node 110b may communicate with a core network (e.g., on a wired and/or wireless backhaul). As shown in FIG. 9, the core network may include an AMF 501 and an LMF 503. Additionally, the RAN node 110a may serve a UE 120 (e.g., OTA). The RAN node 110b may serve a neighboring cell.

The AMF 501 may allocate an identifier to the UE 120 when the UE 120 connects to the RAN node 110a and is assigned to the AMF 501 (e.g., as described in connection with FIG. 8). Additionally, the RAN node 110a may detect a trigger condition. For example, the RAN node 110a may detect a trigger condition as described in connection with reference number 507 of FIG. 5.

Accordingly, in some aspects, the RAN node 110a may transmit, and the AMF 501 may receive, a request associated with a location-based state of the UE 120 served by the RAN node 110a. For example, as shown by reference number 901, and similarly as described in connection with FIG. 8, the RAN node 110a may use an NGAP positioning information request to request that the AMF 501 select an LMF to use for determining the location-based state of the UE 120.

As shown by reference number 903, the AMF 501 may select the LMF 503 to perform UE positioning for the UE 120. Additionally, as shown by reference number 905, the AMF 501 may associate a routing ID associated with the LMF 503 with a correlation ID for the LCS provided by the LMF 503.

Accordingly, as shown by reference number 907, the AMF 501 may transmit, and the LMF 503 may receive, an Nlmf location request. The Nlmf location request may include an NRPPa message extracted by the AMF 501 from the NGAP request from the RAN node 110a. Additionally, the AMF 501 may include the LCS correlation ID and a UE identifier for the UE 120 (e.g., a SUPI and/or a GPSI, among other examples).

Accordingly, as shown by reference number 909, the LMF 503 may perform at least one positioning measurement on the UE 120 based on the Nlmf location request. For example, the LMF 503 may instruct a plurality of base stations to perform measurements on the UE 120 (as identified using the SUPI, the GPSI, and/or another similar identifier indicated by the AMF 501).

After the RAN node 110a transmits the NGAP positioning information request, and as shown by reference number 911, the RAN node 110a may receive an indication of a handover of the UE 120. In example 900, the UE 120 is undergoing handover from the RAN node 110a to the RAN node 110b.

Accordingly, as shown by reference number 913, the RAN node 110a may transmit, and the RAN node 110b may receive, the NGAP positioning information request. Accordingly, the RAN node 110b expects to receive a response to the NGAP positioning information request.

As shown by reference number 915, the LMF 503 may transmit, and the AMF 501 may receive, an Nlmf location response. The Nlmf location response may include an NRPPa message from the LMF 503. In some aspects, the LMF 503 may determine the location-based state of the UE 120 such that the NRPPa message includes an indication of the location-based state. Additionally, or alternatively, the NRPPa message may include measurement values from the at least one positioning measurement. The Nlmf location response may further include the LCS correlation ID.

Accordingly, as shown by reference number 917, the AMF 501 may transmit, and the RAN node 110b may receive, an NGAP message associated with the location-based state of the UE 120. For example, the NGAP message may encapsulate the NRPPa message from the LMF 503. The NRPPa message may include the routing ID associated with the LMF 503 and the identifier associated with the UE 120, such as the UE NGAP ID.

Although described in connection with the RAN node 110a using an NGAP positioning information request, similar handover operations may be performed when a RAN node uses an LMF selection request (e.g., as described in connection with FIGS. 4-6). By using handover operations as described in connection with FIG. 9, the power and processing resources expended on determining whether the UE 120 is flying are not wasted because the NGAP message is re-routed to the new RAN node 110b.

As indicated above, FIG. 9 is provided as an example. Other examples may differ from what is described with respect to FIG. 9.

Figure 10:
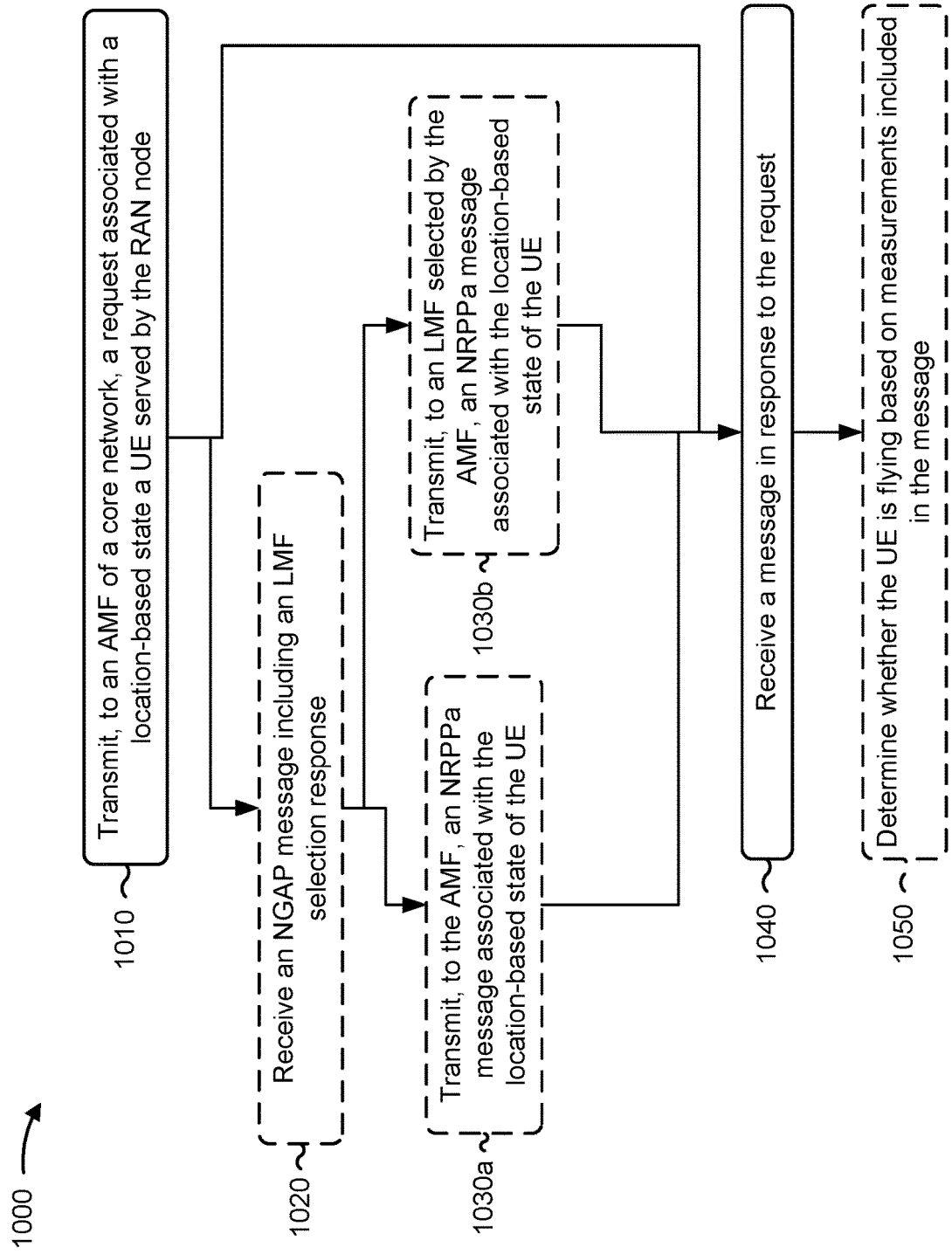
FIGS. 10, 11, and 12 are diagrams illustrating example processes associated with determining a location-based state of a UE, in accordance with the present disclosure.

FIG. 10 is a diagram illustrating an example process 1000 performed, for example, by a RAN node, in accordance with the present disclosure. Example process 1000 is an example where the RAN node (e.g., RAN node 110 and/or apparatus 1300 of FIG. 13) performs operations associated with determining a location-based state of a UE.

As shown in FIG. 10, in some aspects, process 1000 may include transmitting, to an AMF of a core network, a request associated with a location-based state of a UE served by the RAN node (block 1010). For example, the RAN node (e.g., using communication manager 150 and/or transmission component 1304, depicted in FIG. 13) may transmit, to an AMF of a core network, a request associated with a location-based state of a UE served by the RAN node, as described herein.

In some aspects, the request is encapsulated as an NGAP message including an LMF selection request. Accordingly, process 1000 may further include receiving an NGAP message including an LMF selection response with a routing ID associated with an LMF selected by the AMF (block 1020). For example, the RAN node (e.g., using communication manager 150 and/or reception component 1302) may receive an NGAP message including an LMF selection response with a routing ID associated with an LMF selected by the AMF, as described herein.

Additionally, process 1000 may further include transmitting, to the AMF, an NRPPa message associated with the location-based state of the UE (block 1030a). For example, the RAN node (e.g., using communication manager 150 and/or transmission component 1304, depicted in FIG. 13) may transmit, to the AMF, an NRPPa message associated with the location-based state of the UE, as described herein. Accordingly, the message in response to the request is encapsulated as an NRPPa message and is received from the AMF.

As an alternative, the LMF selection response further includes an ID associated with the UE and used by the LMF. Accordingly, process 1000 may further include transmitting, to the LMF, an NRPPa message associated with the location-based state of the UE (block 1030b). For example, the RAN node (e.g., using communication manager 150 and/or transmission component 1304, depicted in FIG. 13) may transmit, to the LMF, an NRPPa message associated with the location-based state of the UE, as described herein. Accordingly, the message in response to the request is encapsulated as an NRPPa message and is received from the LMF.

Alternatively, the request is encapsulated as an NGAP positioning information request and includes a parameter associated with the location-based state of the UE. Accordingly, the message in response to the request is encapsulated as an NGAP positioning information response and is received from the AMF.

As further shown in FIG. 10, in some aspects, process 1000 may include receiving a message in response to the request (block 1040). For example, the RAN (e.g., using communication manager 150 and/or reception component 1302, depicted in FIG. 13) may receive a message in response to the request, as described herein.

In some aspects, process 1000 may further include determining whether the UE is flying using measurements included in the response (block 1050). For example, the RAN node (e.g., using communication manager 150 and/or determination component 1308, depicted in FIG. 13) may determine the UE is flying using measurements included in the response, as described herein.

Process 1000 may include additional aspects, such as any single aspect or any combination of aspects described below and/or in connection with one or more other processes described elsewhere herein.

In a first aspect, the message in response to the request indicates the location-based state of the UE.

In a second aspect, alone or in combination with the first aspect, the request is transmitted based at least in part on a measurement performed by the RAN node and associated with the UE.

In a third aspect, alone or in combination with one or more of the first and second aspects, the request is transmitted based at least in part on subscription information associated with the UE.

In a fourth aspect, alone or in combination with one or more of the first through third aspects, process 1000 further includes determining (e.g., using communication manager 150 and/or determination component 1308), using one or more properties associated with the UE, whether the request is encapsulated as an LMF selection request or an NGAP positioning information request.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
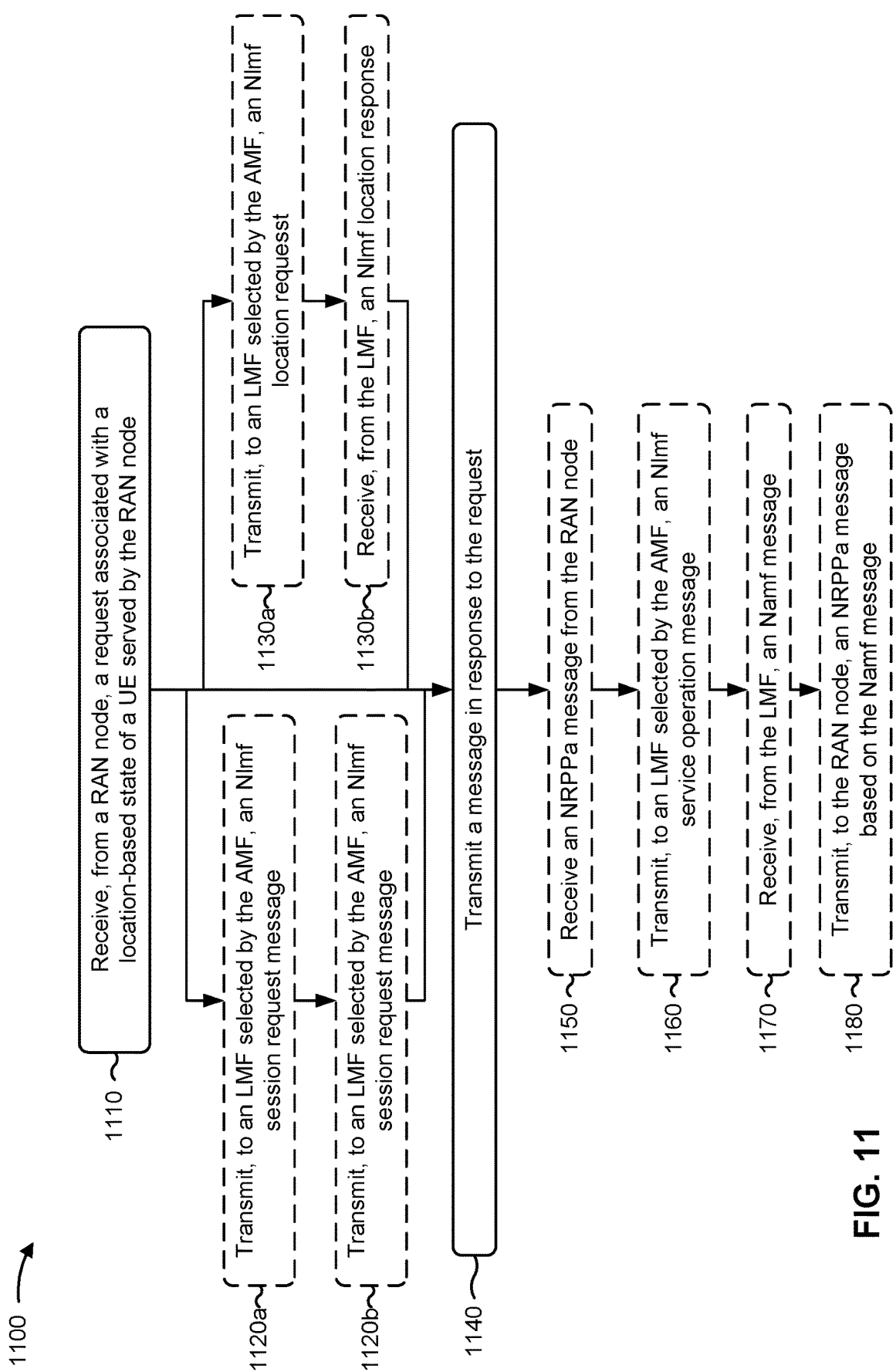

FIG. 11 is a diagram illustrating an example process 1100 performed, for example, by an AMF, in accordance with the present disclosure. Example process 1100 is an example where the AMF (e.g., AMF 501 and/or apparatus 1600 of FIG. 16) performs operations associated with determining a location-based state of a UE.

As shown in FIG. 11, in some aspects, process 1100 may include receiving, from a RAN node, a request associated with a location-based state of a UE served by the RAN node (block 1110). For example, the AMF (e.g., using communication manager 140 and/or reception component 1602, depicted in FIG. 16) may receive, from a RAN node, a request associated with a location-based state of a UE served by the RAN node, as described herein.

In some aspects, the request is encapsulated as an NGAP message including an LMF selection request. Accordingly, in some aspects, process 1100 may further include transmitting, to an LMF selected by the AMF, an Nlmf session request message (block 1120a). For example, the AMF (e.g., using communication manager 140 and/or transmission component 1604, depicted in FIG. 16) may transmit, to an LMF selected by the AMF, an Nlmf session request message, as described herein. Additionally, process 1100 may include receiving, from the LMF, an Nlmf session response message including an ID associated with the UE and used by the LMF (block 1120b). For example, the AMF (e.g., using communication manager 140 and/or reception component 1602) may receive, from the LMF, an Nlmf session response message including an ID associated with the UE and used by the LMF, as described herein.

As an alternative, the request is encapsulated as an NGAP positioning information request. Accordingly, process 1100 may further include transmitting, to an LMF selected by the AMF, an Nlmf location request (block 1130*a*). For example, the AMF (e.g., using communication manager 140 and/or transmission component 1604) may transmit, to an LMF selected by the AMF, an Nlmf location request, as described herein. Additionally, process 1100 may include receiving, from the LMF, an Nlmf location response (block 1130*b*). For example, the AMF (e.g., using communication manager 140 and/or reception component 1602) may receive, from the LMF, an Nlmf location response, as described herein.

As further shown in FIG. 11, in some aspects, process 1100 may include transmitting a message in response to the request (block 1140). For example, the AMF (e.g., using communication manager 140 and/or transmission component 1604) may transmit a message in response to the request, as described herein.

In some aspects, the message in response to the request is encapsulated as an NGAP message including an LMF selection response with a routing ID associated with an LMF selected by the AMF. Additionally, in some aspects, the LMF selection response further includes the ID associated with the UE and used by the LMF.

As an alternative, process 1100 may further include receiving, from the RAN node, an NRPPa message associated with the location-based state of the UE (block 1150). For example, the AMF (e.g., using communication manager 140 and/or reception component 1602) may receive, from the RAN node, an NRPPa message associated with the location-based state of the UE, as described herein. Additionally, process 1100 may include transmitting, to the LMF selected by the AMF, an Nlmf service operation message associated with the location-based state of the UE (block 1160). For example, the AMF (e.g., using communication manager 140 and/or transmission component 1604) may transmit, to the LMF selected by the AMF, an Nlmf service operation message associated with the location-based state of the UE, as described herein.

Accordingly, process 1100 may further include receiving, from the LMF, an Namf message (block 1170). For example, the AMF (e.g., using communication manager 140 and/or reception component 1602) may receive, from the LMF, an Namf message, as described herein. Additionally, process 1100 may include transmitting, to the RAN node, an NRPPa message based on the Namf message (block 1180). For example, the AMF (e.g., using communication manager 140 and/or transmission component 1604) may transmit, to the RAN node, an NRPPa message based on the Namf message, as described herein.

As an alternative, the message in response to the request is encapsulated as an NGAP positioning information response.

Process 1100 may include additional aspects, such as any single aspect or any combination of aspects described below and/or in connection with one or more other processes described elsewhere herein.

Figure 16:
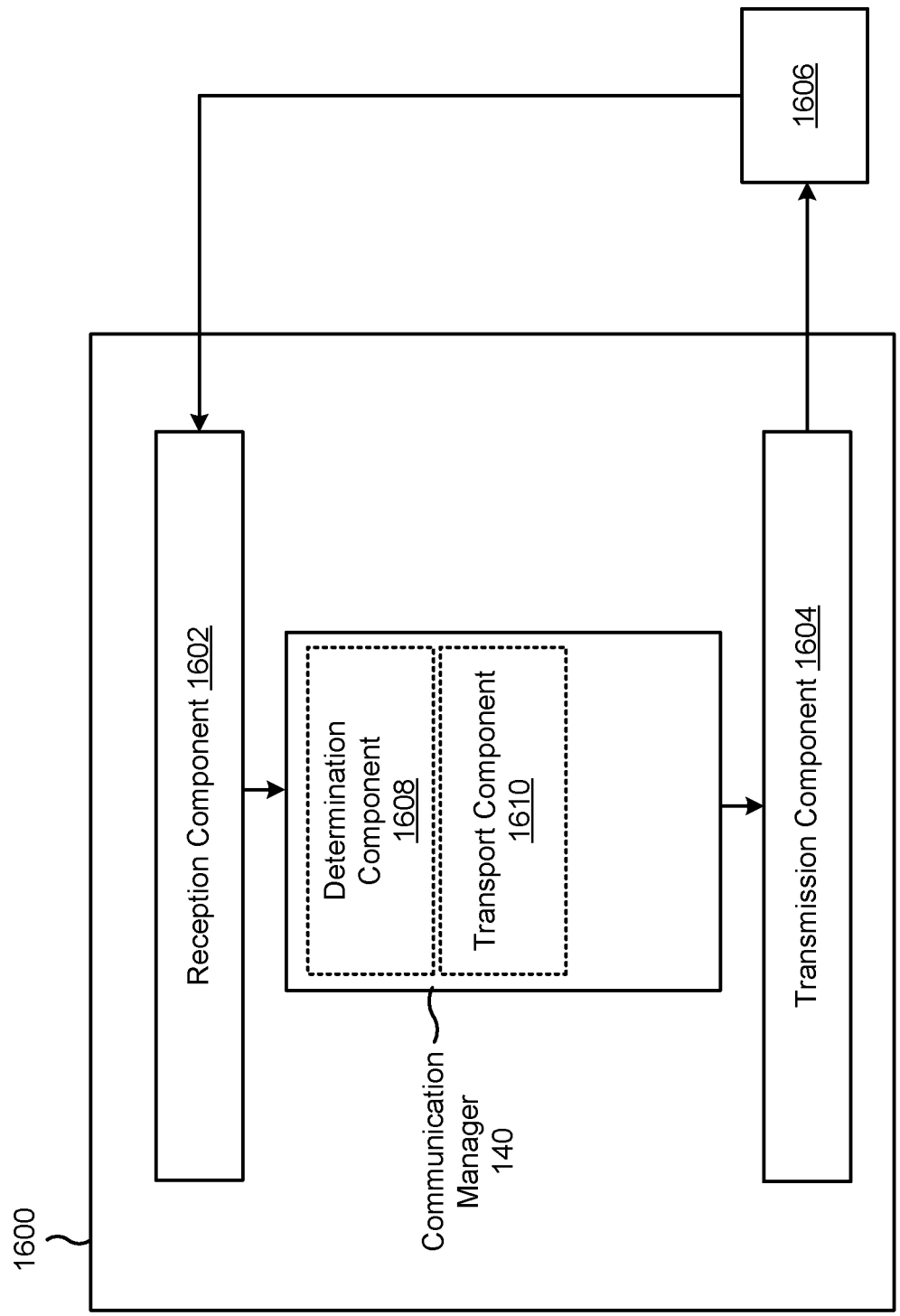
FIG. 16 is a diagram of an example apparatus for wireless communication, in accordance with the present disclosure.

In a first aspect, process 1100 includes determining (e.g., using communication manager 140 and/or determination component 1608, depicted in FIG. 16) whether the UE is flying.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
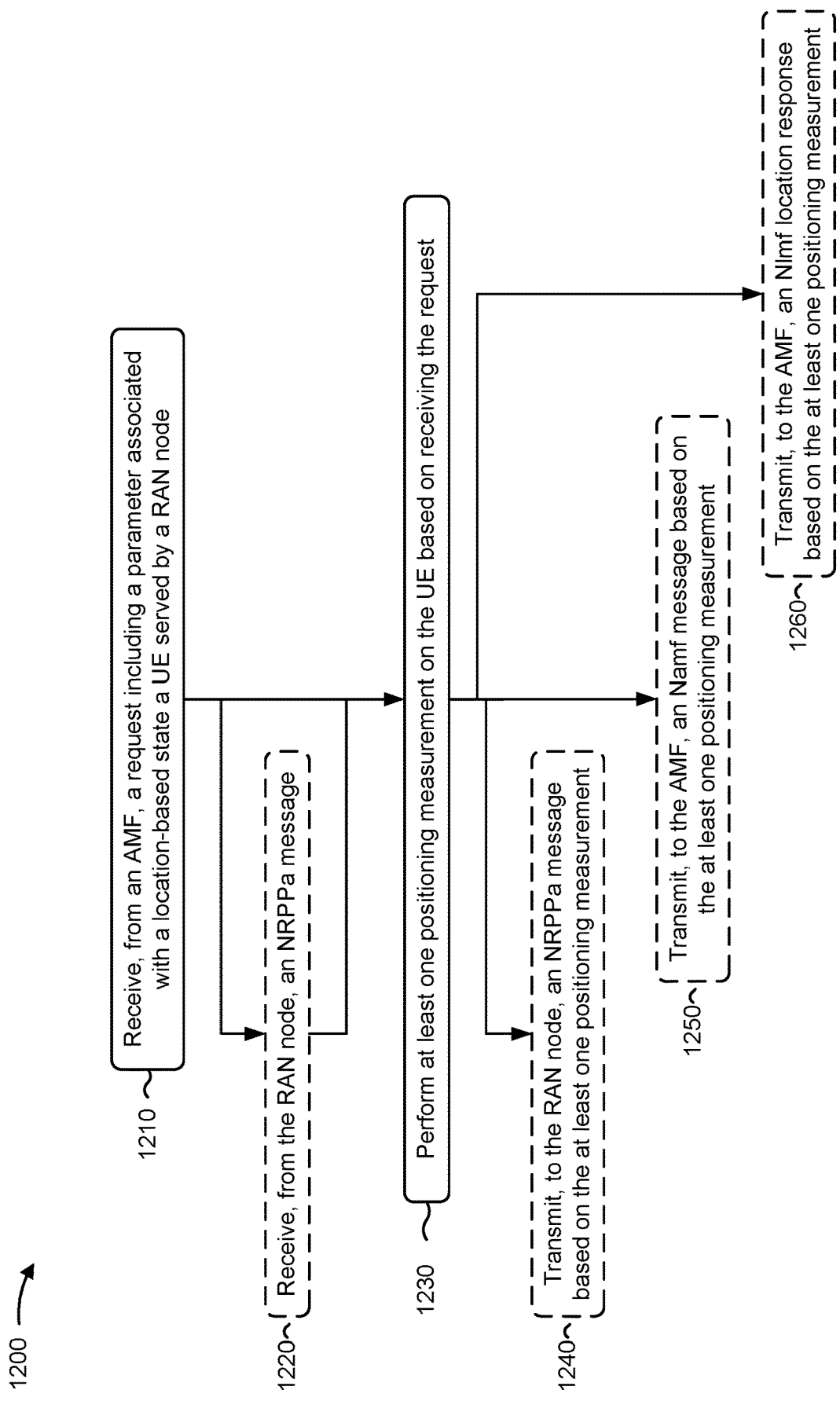

FIG. 12 is a diagram illustrating an example process 1200 performed, for example, by an LMF, in accordance with the present disclosure. Example process 1200 is an example where the LMF (e.g., LMF 503 and/or apparatus 1900 of FIG. 19) performs operations associated with determining a location-based state of a UE.

As shown in FIG. 12, in some aspects, process 1200 may include receiving, from an AMF of a core network, a request including a parameter associated with a location-based state of a UE served by a RAN node (block 1210). For example, the LMF (e.g., using communication manager 140 and/or reception component 1902, depicted in FIG. 19) may receive, from an AMF of the core network, a request including a parameter associated with a location-based state of a UE served by a RAN node, as described herein.

In some aspects, the request is encapsulated as an Nlmf session request message. Accordingly, process 1200 may further include receiving, from the RAN node, an NRPPa message associated with the location-based state of the UE (block 1220). For example, the LMF (e.g., using communication manager 140 and/or reception component 1902) may receive, from the RAN node, an NRPPa message associated with the location-based state of the UE, as described herein.

As an alternative, the request is encapsulated as an Nlmf service operation message associated with the location-based state of the UE. Alternatively, the request is encapsulated as an Nlmf location request.

As further shown in FIG. 12, in some aspects, process 1200 may include performing at least one positioning measurement on the UE based on the request (block 1230). For example, the LMF (e.g., using communication manager 140 and/or positioning component 1908, depicted in FIG. 19) may perform at least one positioning measurement on the UE based on the request, as described herein.

In some aspects, process 1200 may further include transmitting, to the RAN node, an NRPPa message based on the at least one positioning measurement (block 1240). For example, the LMF (e.g., using communication manager 140 and/or transmission component 1904, depicted in FIG. 19) may transmit, to the RAN node, an NRPPa message based on the at least one positioning measurement, as described herein.

As an alternative, process 1200 may further include transmitting, to the AMF, an Namf message based on the at least one positioning measurement (block 1250). For example, the LMF (e.g., using communication manager 140 and/or transmission component 1904) may transmit, to the AMF, an Namf message based on the at least one positioning measurement, as described herein.

As an alternative, process 1200 may further include transmitting, to the AMF, an Nlmf location response based on the at least one positioning measurement (block 1260). For example, the LMF (e.g., using communication manager 140 and/or transmission component 1904) may transmit, to the AMF, an Nlmf location response based on the at least one positioning measurement, as described herein.

Process 1200 may include additional aspects, such as any single aspect or any combination of aspects described below and/or in connection with one or more other processes described elsewhere herein.

Figure 19:
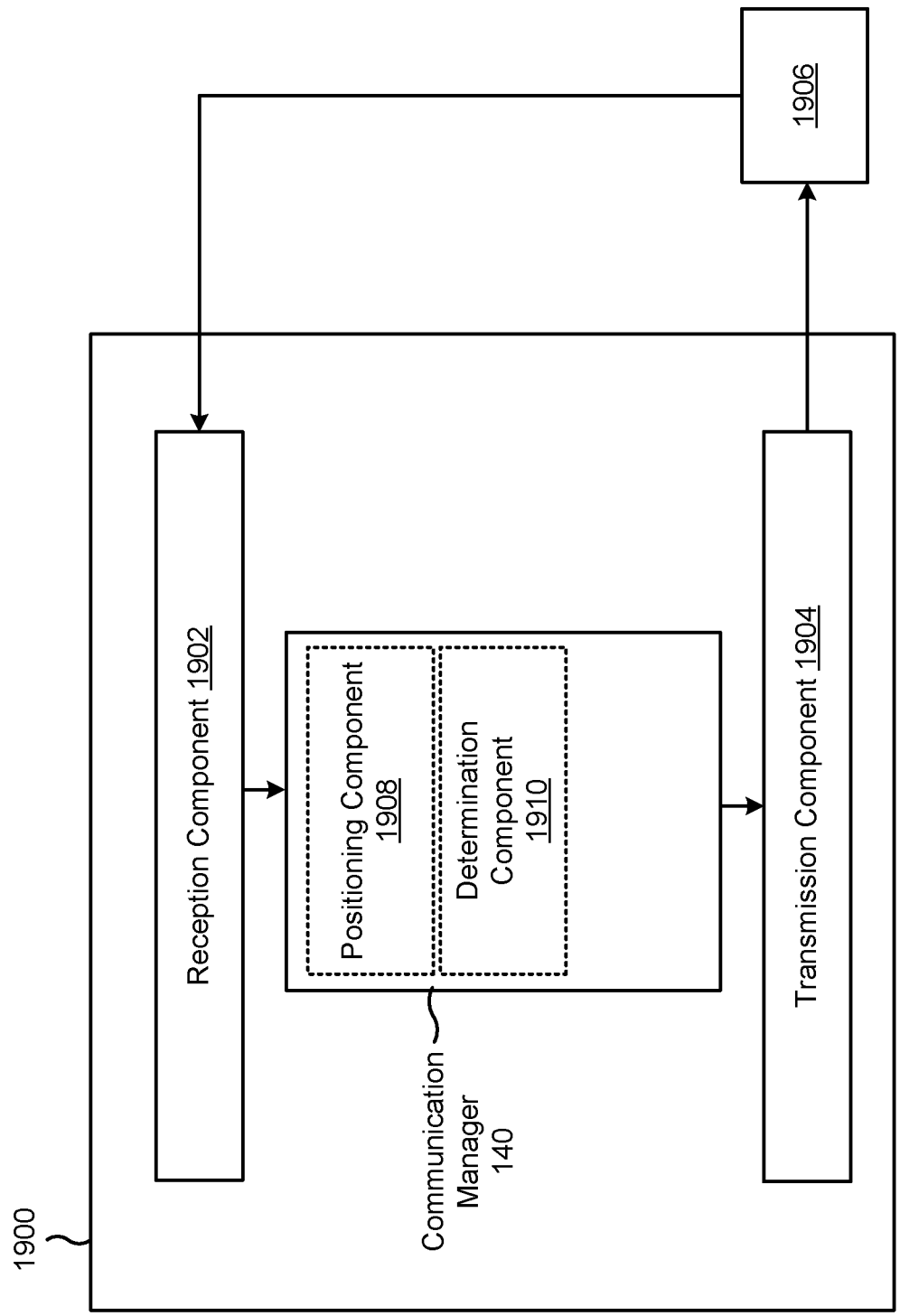
FIG. 19 is a diagram of an example apparatus for wireless communication, in accordance with the present disclosure.

In a first aspect, process 1200 further includes determining (e.g., using communication manager 140 and/or determination component 1910, depicted in FIG. 19) whether the UE is flying using the at least one positioning measurement.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
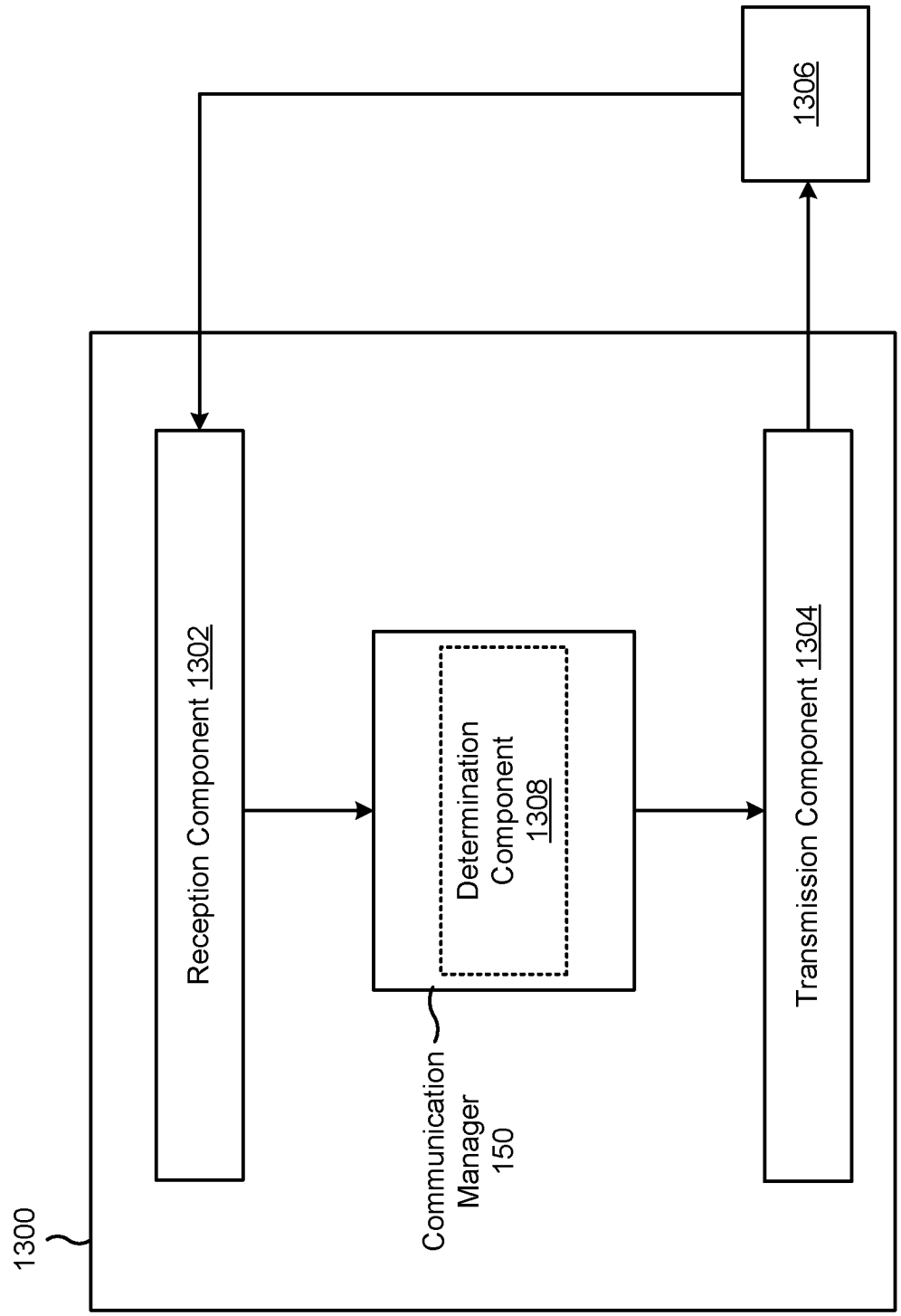
FIG. 13 is a diagram of an example apparatus for wireless communication, in accordance with the present disclosure.

FIG. 13 is a diagram of an example apparatus 1300 for wireless communication. The apparatus 1300 may be a RAN node, or a RAN node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 4-9. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

In some aspects, the transmission component 1304 may transmit (e.g., to the apparatus 1306, such as an AMF of a core network) a request associated with a location-based state of a UE served by the apparatus 1300. Accordingly, the reception component 1302 may receive a message in response to the request.

In some aspects, the request is encapsulated as an NGAP message including an LMF selection request. Accordingly, the reception component 1302 may receive an NGAP message including an LMF selection response with a routing ID associated with an LMF selected by the AMF. Additionally, the transmission component 1304 may transmit (e.g., to the apparatus 1306) an NRPPa message associated with the location-based state of the UE. Accordingly, the message in response to the request is encapsulated as an NRPPa message and is received from the AMF.

As an alternative, the LMF selection response further includes an ID associated with the UE and used by an LMF. Accordingly, the transmission component 1304 may transmit (e.g., to the LMF of the core network) an NRPPa message associated with the location-based state of the UE. Accordingly, the message in response to the request is encapsulated as an NRPPa message and is received from the LMF.

Alternatively, the request is encapsulated as an NGAP positioning information request and includes a parameter associated with the location-based state of the UE. Accordingly, the message in response to the request is encapsulated as an NGAP positioning information response and is received from the AMF.

In some aspects, the determination component 1308 may determine whether the UE is flying using measurements included in the message in response to the request. Additionally, or alternatively, the determination component 1308 may determine, using one or more properties associated with the UE, whether the request is encapsulated as an LMF selection request or an NGAP positioning information request. The determination component 1308 may include a MIMO detector, a receive processor, transmit MIMO processor, a transmit processor, a controller/processor, a memory, or a combination thereof, of the base station described in connection with FIG. 2.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
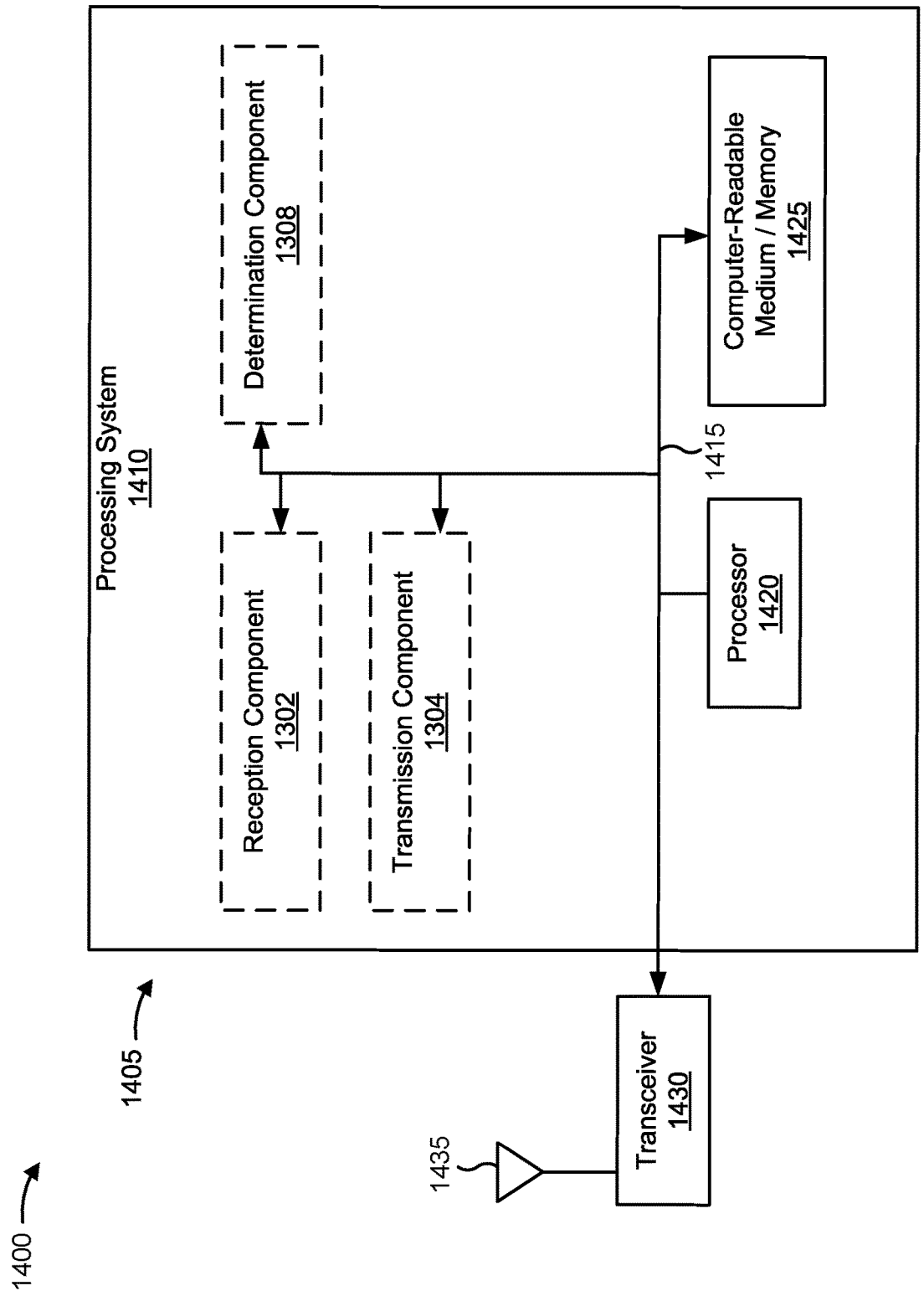
FIG. 14 is a diagram illustrating an example of a hardware implementation for an apparatus employing a processing system, in accordance with the present disclosure.

FIG. 14 is a diagram illustrating an example 1400 of a hardware implementation for an apparatus 1405 employing a processing system 1410. The apparatus 1405 may be a RAN node.

The processing system 1410 may be implemented with a bus architecture, represented generally by the bus 1415. The bus 1415 may include any number of interconnecting buses and bridges depending on the specific application of the processing system 1410 and the overall design constraints. The bus 1415 links together various circuits including one or more processors and/or hardware components, represented by the processor 1420, the illustrated components, and the computer-readable medium/memory 1425. The bus 1415 may also link various other circuits, such as timing sources, peripherals, voltage regulators, and/or power management circuits.

The processing system 1410 may be coupled to a transceiver 1430. The transceiver 1430 is coupled to one or more antennas 1435. The transceiver 1430 provides a means for communicating with various other apparatuses over a transmission medium. The transceiver 1430 receives a signal from the one or more antennas 1435, extracts information from the received signal, and provides the extracted information to the processing system 1410, specifically the reception component 1302. In addition, the transceiver 1430 receives information from the processing system 1410, specifically the transmission component 1304, and generates a signal to be applied to the one or more antennas 1435 based at least in part on the received information.

The processing system 1410 includes a processor 1420 coupled to a computer-readable medium/memory 1425. The processor 1420 is responsible for general processing, including the execution of software stored on the computer-readable medium/memory 1425. The software, when executed by the processor 1420, causes the processing system 1410 to perform the various functions described herein for any particular apparatus. The computer-readable medium/memory 1425 may also be used for storing data that is manipulated by the processor 1420 when executing software. The processing system further includes at least one of the illustrated components. The components may be software modules running in the processor 1420, resident/stored in the computer readable medium/memory 1425, one or more hardware modules coupled to the processor 1420, or some combination thereof.

In some aspects, the processing system 1410 may be a component of the base station 110 and may include the memory 242 and/or at least one of the TX MIMO processor 230, the RX processor 238, and/or the controller/processor 240. In some aspects, the apparatus 1405 for wireless communication includes means for transmitting, to an AMF of a core network, a request associated with a location-based state of a UE served by the base station 110 is flying; and/or means for receiving a message in response to the request. The aforementioned means may be one or more of the aforementioned components of the apparatus 1300 and/or the processing system 1410 of the apparatus 1405 configured to perform the functions recited by the aforementioned means. As described elsewhere herein, the processing system 1410 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 14 is provided as an example. Other examples may differ from what is described in connection with FIG. 14.

Figure 15:
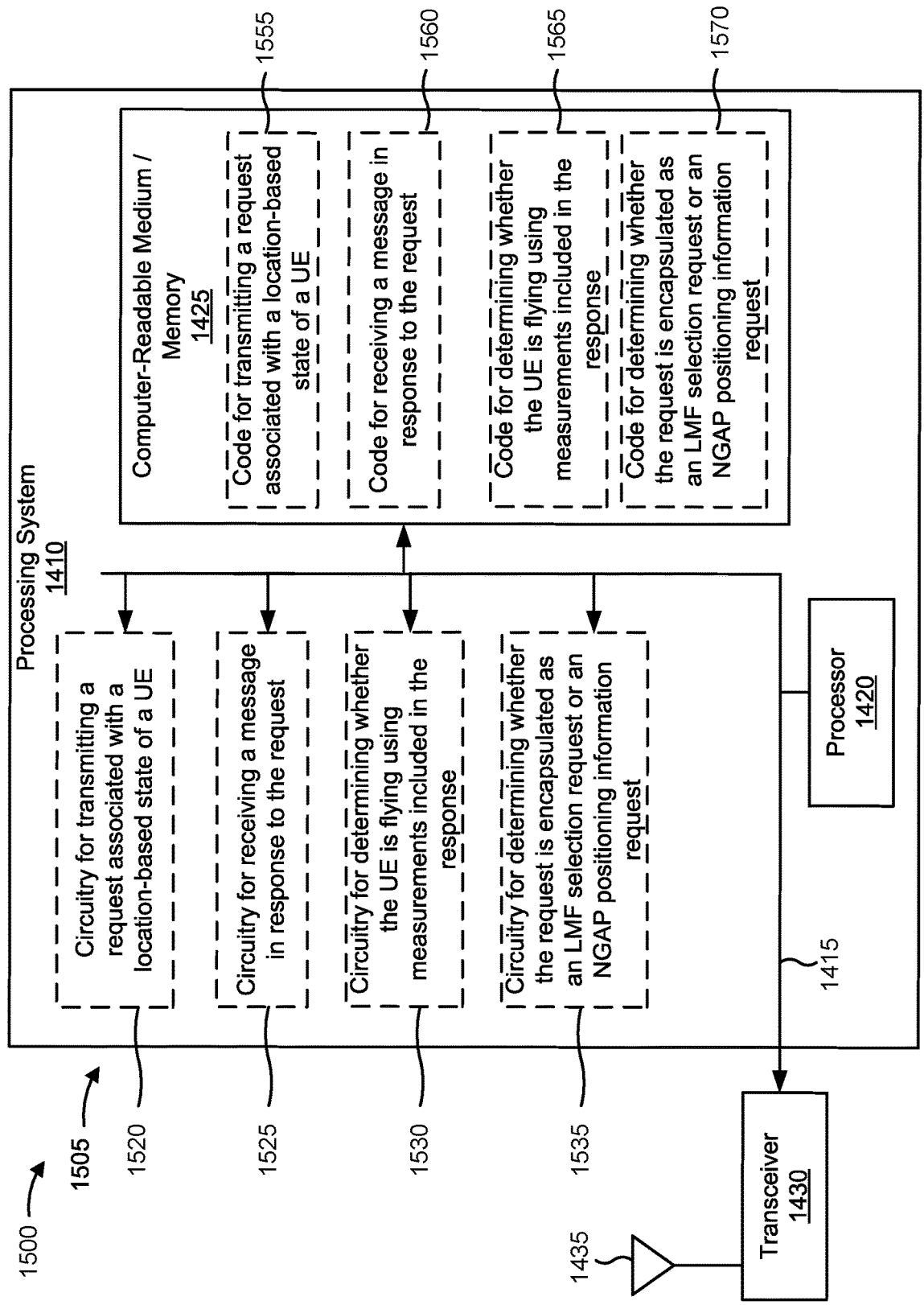
FIG. 15 is a diagram illustrating an example implementation of code and circuitry for an apparatus, in accordance with the present disclosure.

FIG. 15 is a diagram illustrating an example 1500 of an implementation of code and circuitry for an apparatus 1505. The apparatus 1505 may be a RAN node, such as RAN node 110, among other examples.

As further shown in FIG. 15, the apparatus may include circuitry for transmitting a request associated with a location-based state of a UE (circuitry 1520). For example, the apparatus may include circuitry to enable the apparatus to transmit a request associated with a location-based state of a UE.

As further shown in FIG. 15, the apparatus may include circuitry for receiving a message in response to the request (circuitry 1525). For example, the apparatus may include circuitry to enable the apparatus to receive a message in response to the request.

As further shown in FIG. 15, the apparatus may include circuitry for determining whether the UE is flying using measurements included in the response (circuitry 1530). For example, the apparatus may include circuitry to enable the apparatus to determine whether the UE is flying using measurements included in the response.

As further shown in FIG. 15, the apparatus may include circuitry for determining whether the request is encapsulated as an LMF selection request or an NGAP positioning information request (circuitry 1535). For example, the apparatus may include circuitry to enable the apparatus to determine whether the request is encapsulated as an LMF selection request or an NGAP positioning information request.

As further shown in FIG. 15, the apparatus may include, stored in computer-readable medium 1425, code for transmitting a request associated with a location-based state of a UE (code 1555). For example, the apparatus may include code that, when executed by the processor 1420, may cause the transceiver 1430 to transmit a request associated with a location-based state of a UE.

As further shown in FIG. 15, the apparatus may include, stored in computer-readable medium 1425, code for receiving a message in response to the request (code 1560). For example, the apparatus may include code that, when executed by the processor 1420, may cause the transceiver 1430 to receive a message in response to the request.

As further shown in FIG. 15, the apparatus may include, stored in computer-readable medium 1425, code for determining whether the UE is flying using measurements included in the response (code 1565). For example, the apparatus may include code that, when executed by the processor 1420, may cause the processor 1420 to determine whether the UE is flying using measurements included in the response.

As further shown in FIG. 15, the apparatus may include, stored in computer-readable medium 1425, code for determining whether the request is encapsulated as an LMF selection request or an NGAP positioning information request (code 1570). For example, the apparatus may include code that, when executed by the processor 1420, may cause the transceiver 1430 to transmit the request encapsulated as an LMF selection request or an NGAP positioning information request.

FIG. 15 is provided as an example. Other examples may differ from what is described in connection with FIG. 15.

FIG. 16 is a diagram of an example apparatus 1600 for wireless communication. The apparatus 1600 may be an AMF, or an AMF may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a determination component 1608 or a transport component 1610, among other examples.

In some aspects, the apparatus 1600 may be configured to perform one or more operations described herein in connection with FIGS. 4-9. Additionally, or alternatively, the apparatus 1600 may be configured to perform one or more processes described herein, such as process 1100 of FIG. 11, or a combination thereof. In some aspects, the apparatus 1600 and/or one or more components shown in FIG. 16 may include one or more components of the network controller described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include a communication unit, a controller/processor, a memory, or a combination thereof, of the network controller described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include a communication unit, a controller/processor, a memory, or a combination thereof, of the network controller described in connection with FIG. 2. In some aspects, the transmission component 1604 may be co-located with the reception component 1602 in a transceiver.

In some aspects, the reception component 1602 may receive (e.g., from the apparatus 1606, such as a RAN node) a request associated with a location-based state of a UE served by the RAN node. Accordingly, the transmission component 1604 may transmit a message in response to the request.

In some aspects, the request is encapsulated as an NGAP message including an LMF selection request. Accordingly, the transmission component 1604 may transmit, to an LMF selected by the apparatus 1600, an Nlmf session request message. Additionally, the reception component 1602 may receive, from the LMF, an Nlmf session response message including an ID associated with the UE and used by the LMF. The transport component 1610 may thus forward the ID from the LMF to the RAN node to allow the RAN node to communicate directly with the LMF. In some aspects, the transport component 1610 may include a communication unit, a controller/processor, a memory, or a combination thereof, of the network controller described in connection with FIG. 2. Accordingly, the message in response to the request is encapsulated as an NGAP message including an LMF selection response with a routing ID associated with an LMF selected by the AMF.

As an alternative, the reception component 1602 may receive (e.g., from the RAN node) an NRPPa message associated with the location-based state of the UE. Accordingly, the transmission component 1604 may transmit, to an LMF selected by the apparatus 1600, an Nlmf service operation message, and the reception component 1602 may receive, from the LMF, an Namf message. The transport component 1610 may thus forward the request from the RAN node to the LMF as an NRPPa message. Accordingly, LMF selection response may further include the ID associated with the UE and used by the LMF.

As an alternative, the request is encapsulated as an NGAP positioning information request. Accordingly, the transmission component 1604 may transmit, to an LMF selected by the apparatus 1600, an Nlmf location request, and the reception component 1602 may receive, from the LMF, an Nlmf location response. Accordingly, the message in response to the request is encapsulated as an NGAP positioning information response.

In some aspects, the determination component 1608 may determine whether the UE is flying using measurements included in the response. In some aspects, the determination component 1608 may include a controller/processor, a memory, or a combination thereof, of the network controller described in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
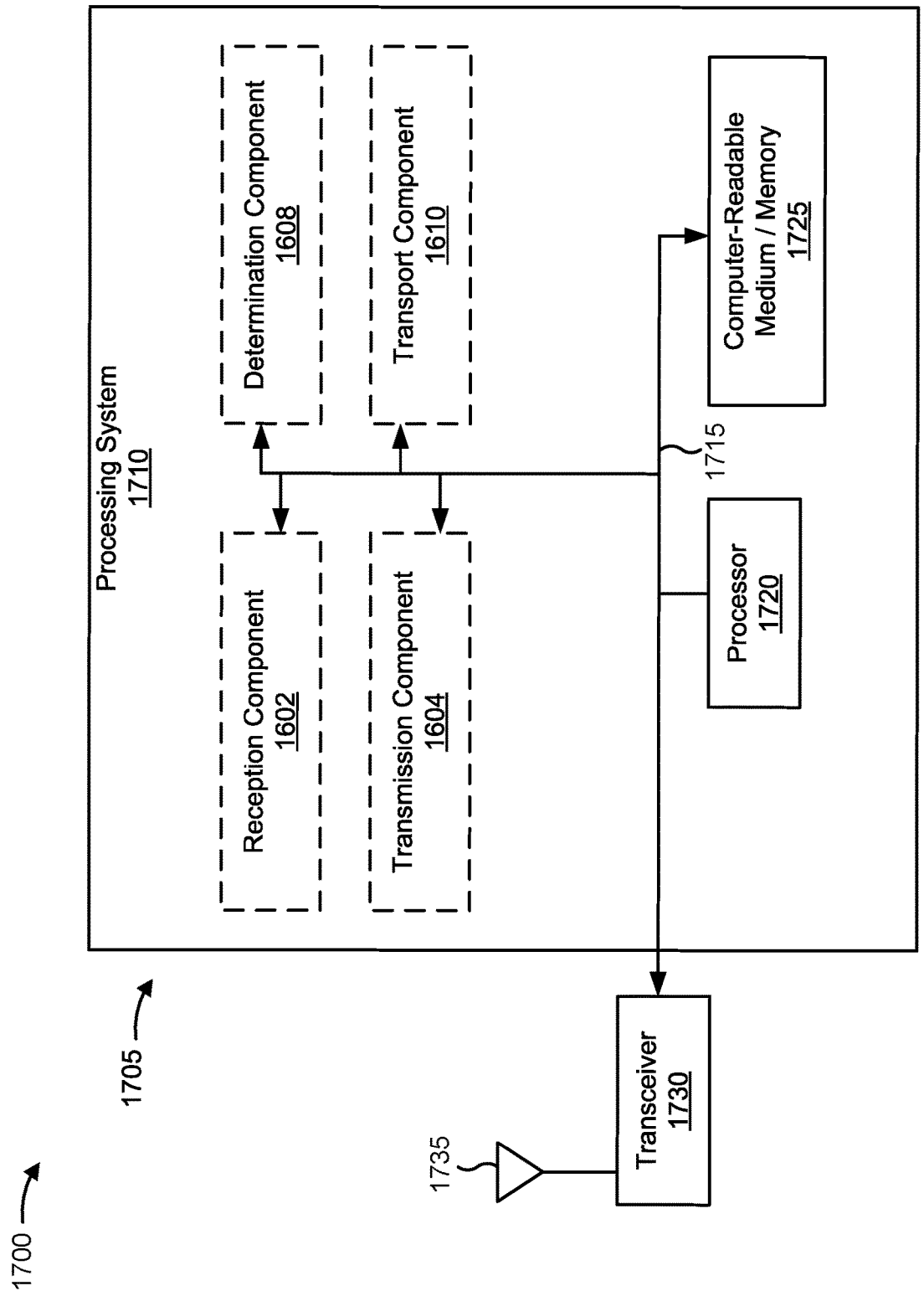
FIG. 17 is a diagram illustrating an example of a hardware implementation for an apparatus employing a processing system, in accordance with the present disclosure.

FIG. 17 is a diagram illustrating an example 1700 of a hardware implementation for an apparatus 1705 employing a processing system 1710. The apparatus 1705 may be an AMF.

The processing system 1710 may be implemented with a bus architecture, represented generally by the bus 1715. The bus 1715 may include any number of interconnecting buses and bridges depending on the specific application of the processing system 1710 and the overall design constraints. The bus 1715 links together various circuits including one or more processors and/or hardware components, represented by the processor 1720, the illustrated components, and the computer-readable medium/memory 1725. The bus 1715 may also link various other circuits, such as timing sources, peripherals, voltage regulators, and/or power management circuits.

The processing system 1710 may be coupled to a transceiver 1730. The transceiver 1730 is coupled to one or more antennas 1735. The transceiver 1730 provides a means for communicating with various other apparatuses over a transmission medium. The transceiver 1730 receives a signal from the one or more antennas 1735, extracts information from the received signal, and provides the extracted information to the processing system 1710, specifically the reception component 1602. In addition, the transceiver 1730 receives information from the processing system 1710, specifically the transmission component 1604, and generates a signal to be applied to the one or more antennas 1735 based at least in part on the received information.

The processing system 1710 includes a processor 1720 coupled to a computer-readable medium/memory 1725. The processor 1720 is responsible for general processing, including the execution of software stored on the computer-readable medium/memory 1725. The software, when executed by the processor 1720, causes the processing system 1710 to perform the various functions described herein for any particular apparatus. The computer-readable medium/memory 1725 may also be used for storing data that is manipulated by the processor 1720 when executing software. The processing system further includes at least one of the illustrated components. The components may be software modules running in the processor 1720, resident/stored in the computer readable medium/memory 1725, one or more hardware modules coupled to the processor 1720, or some combination thereof.

In some aspects, the processing system 1710 may be a component of the network controller 130 and may include the memory 292 and/or at least one of the communication unit 294 and/or the controller/processor 290. In some aspects, the apparatus 1705 for wireless communication includes means for receiving, from a RAN node, a request associated with a location-based state of a UE served by the RAN node; and/or means for transmitting a message in response to the request. The aforementioned means may be one or more of the aforementioned components of the apparatus 1600 and/or the processing system 1710 of the apparatus 1705 configured to perform the functions recited by the aforementioned means. As described elsewhere herein, the processing system 1710 may include the communication unit 294 and/or the controller/processor 290. In one configuration, the aforementioned means may be the communication unit 294 and/or the controller/processor 290 configured to perform the functions and/or operations recited herein.

FIG. 17 is provided as an example. Other examples may differ from what is described in connection with FIG. 17.

Figure 18:
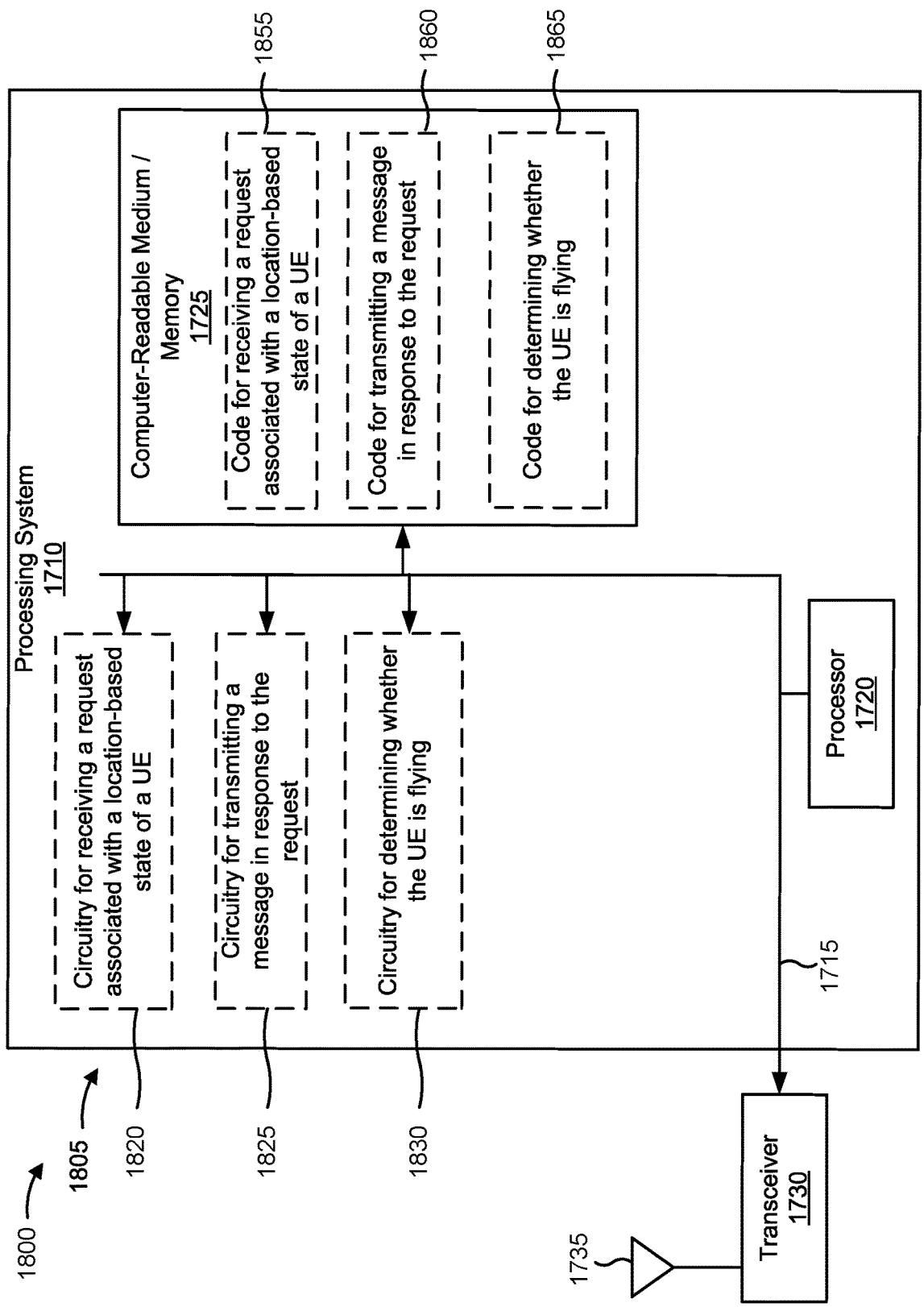
FIG. 18 is a diagram illustrating an example implementation of code and circuitry for an apparatus, in accordance with the present disclosure.

FIG. 18 is a diagram illustrating an example 1800 of an implementation of code and circuitry for an apparatus 1805. The apparatus 1805 may be an AMF, such as AMF 501, among other examples.

As further shown in FIG. 18, the apparatus may include circuitry for transmitting a request associated with a location-based state of a UE (circuitry 1820). For example, the apparatus may include circuitry to enable the apparatus to transmit a request associated with a location-based state of a UE.

As further shown in FIG. 18, the apparatus may include circuitry for transmitting a message in response to the request (circuitry 1825). For example, the apparatus may include circuitry to enable the apparatus to transmit a message in response to the request.

As further shown in FIG. 18, the apparatus may include circuitry for determining whether the UE is flying (circuitry 1830). For example, the apparatus may include circuitry to enable the apparatus to determine whether the UE is flying.

As further shown in FIG. 18, the apparatus may include, stored in computer-readable medium 1725, code for transmitting a request associated with a location-based state of a UE (code 1855). For example, the apparatus may include code that, when executed by the processor 1720, may cause the transceiver 1730 to transmit a request associated with a location-based state of a UE.

As further shown in FIG. 18, the apparatus may include, stored in computer-readable medium 1725, code for transmitting a message in response to the request (code 1860). For example, the apparatus may include code that, when executed by the processor 1720, may cause the transceiver 1730 to transmit a message in response to the request.

As further shown in FIG. 18, the apparatus may include, stored in computer-readable medium 1725, code for determining whether the UE is flying (code 1865). For example, the apparatus may include code that, when executed by the processor 1720, may cause the processor 1720 to determine whether the UE is flying.

FIG. 18 is provided as an example. Other examples may differ from what is described in connection with FIG. 18.

FIG. 19 is a diagram of an example apparatus 1900 for wireless communication. The apparatus 1900 may be an LMF, or an LMF may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include the communication manager 140. The communication manager 140 may include one or more of a positioning component 1908 or a determination component 1910, among other examples.

In some aspects, the apparatus 1900 may be configured to perform one or more operations described herein in connection with FIGS. 4-9. Additionally, or alternatively, the apparatus 1900 may be configured to perform one or more processes described herein, such as process 1200 of FIG. 12, or a combination thereof. In some aspects, the apparatus 1900 and/or one or more components shown in FIG. 19 may include one or more components of the network controller described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include a communication unit, a controller/processor, a memory, or a combination thereof, of the network controller described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include a communication unit, a controller/processor, a memory, or a combination thereof, of the network controller described in connection with FIG. 2. In some aspects, the transmission component 1904 may be co-located with the reception component 1902 in a transceiver.

In some aspects, the reception component 1902 may receive (e.g., from the apparatus 1906, such as an AMF of the core network) a request including a parameter associated with a location-based state of a UE served by a RAN node. Accordingly, the positioning component 1908 may perform at least one positioning measurement on the UE based on the request. In some aspects, the positioning component 1908 may include a communication unit, a controller/processor, a memory, or a combination thereof, of the network controller described in connection with FIG. 2.

In some aspects, the transmission component 1904 may transmit (e.g., to the RAN node) an NRPPa response based on the at least one positioning measurement. Additionally, in some aspects, the reception component 1902 may receive (e.g., from the RAN node) an NRPPa message associated with the location-based state of the UE.

As an alternative, the transmission component 1904 may transmit (e.g., to the AMF) an Namf message or an Nlmf location response based on the at least one positioning measurement.

In some aspects, the determination component 1910 may determine whether the UE is flying using the at least one positioning measurement. In some aspects, the determination component 1910 may include a controller/processor, a memory, or a combination thereof, of the network controller described in connection with FIG. 2.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
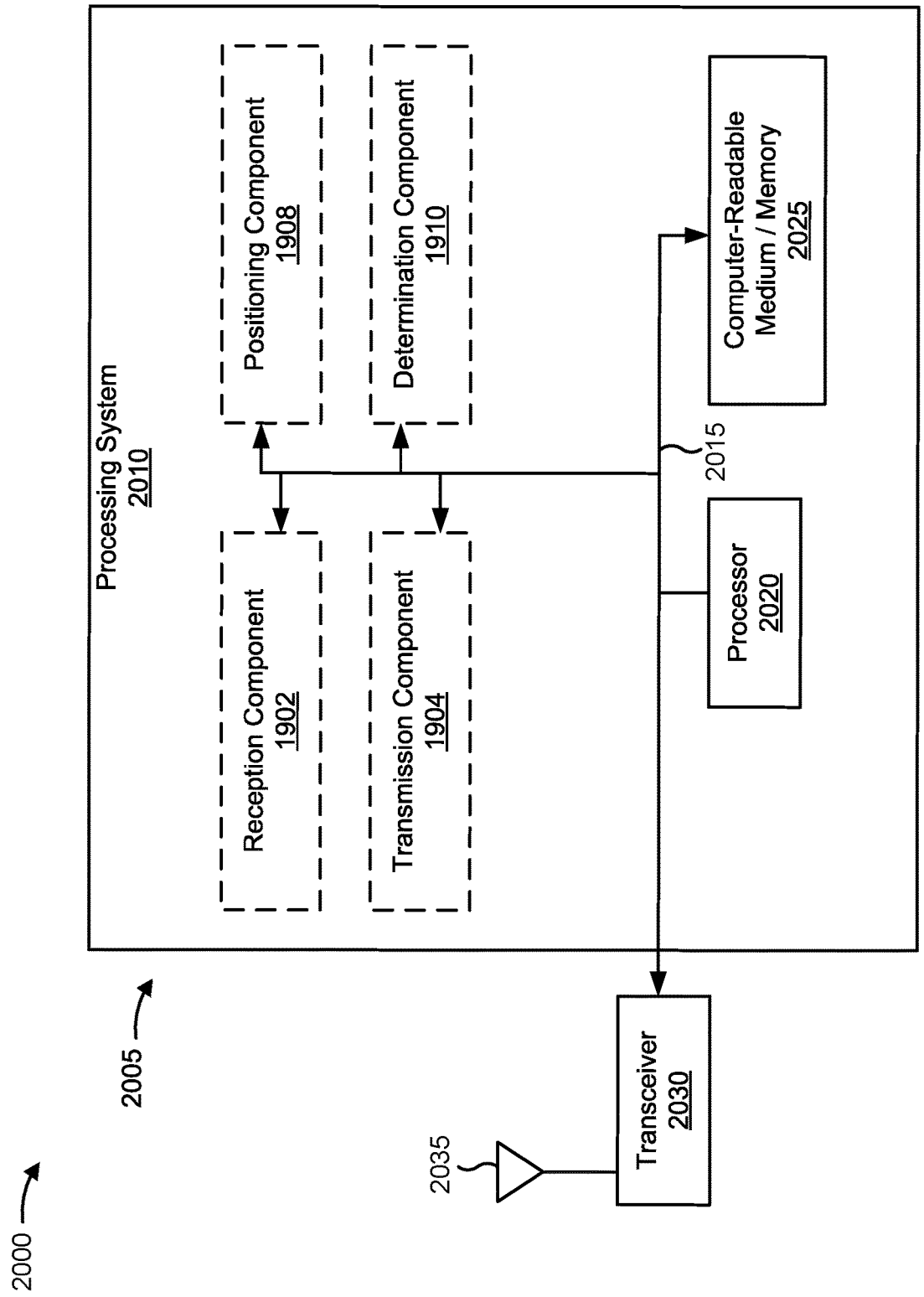
FIG. 20 is a diagram illustrating an example of a hardware implementation for an apparatus employing a processing system, in accordance with the present disclosure.

FIG. 20 is a diagram illustrating an example 2000 of a hardware implementation for an apparatus 2005 employing a processing system 2010. The apparatus 2005 may be an LMF.

The processing system 2010 may be implemented with a bus architecture, represented generally by the bus 2015. The bus 2015 may include any number of interconnecting buses and bridges depending on the specific application of the processing system 2010 and the overall design constraints. The bus 2015 links together various circuits including one or more processors and/or hardware components, represented by the processor 2020, the illustrated components, and the computer-readable medium/memory 2025. The bus 2015 may also link various other circuits, such as timing sources, peripherals, voltage regulators, and/or power management circuits.

The processing system 2010 may be coupled to a transceiver 2030. The transceiver 2030 is coupled to one or more antennas 2035. The transceiver 2030 provides a means for communicating with various other apparatuses over a transmission medium. The transceiver 2030 receives a signal from the one or more antennas 2035, extracts information from the received signal, and provides the extracted information to the processing system 2010, specifically the reception component 1902. In addition, the transceiver 2030 receives information from the processing system 2010, specifically the transmission component 1904, and generates a signal to be applied to the one or more antennas 2035 based at least in part on the received information.

The processing system 2010 includes a processor 2020 coupled to a computer-readable medium/memory 2025. The processor 2020 is responsible for general processing, including the execution of software stored on the computer-readable medium/memory 2025. The software, when executed by the processor 2020, causes the processing system 2010 to perform the various functions described herein for any particular apparatus. The computer-readable medium/memory 2025 may also be used for storing data that is manipulated by the processor 2020 when executing software. The processing system further includes at least one of the illustrated components. The components may be software modules running in the processor 2020, resident/stored in the computer readable medium/memory 2025, one or more hardware modules coupled to the processor 2020, or some combination thereof.

In some aspects, the processing system 2010 may be a component of the base station 110 and may include the memory 292 and/or at least one of the communication unit 294 and/or the controller/processor 290. In some aspects, the apparatus 2005 for wireless communication includes means for receiving, from an AMF of the core network, a request including a parameter associated with a location-based state of a UE served by a RAN node; and/or means for performing at least one positioning measurement on the UE based on the request. The aforementioned means may be one or more of the aforementioned components of the apparatus 1900 and/or the processing system 2010 of the apparatus 2005 configured to perform the functions recited by the aforementioned means. As described elsewhere herein, the processing system 2010 may include the communication unit 294 and/or the controller/processor 290. In one configuration, the aforementioned means may be the communication unit 294 and/or the controller/processor 290 configured to perform the functions and/or operations recited herein.

FIG. 20 is provided as an example. Other examples may differ from what is described in connection with FIG. 20.

Figure 21:
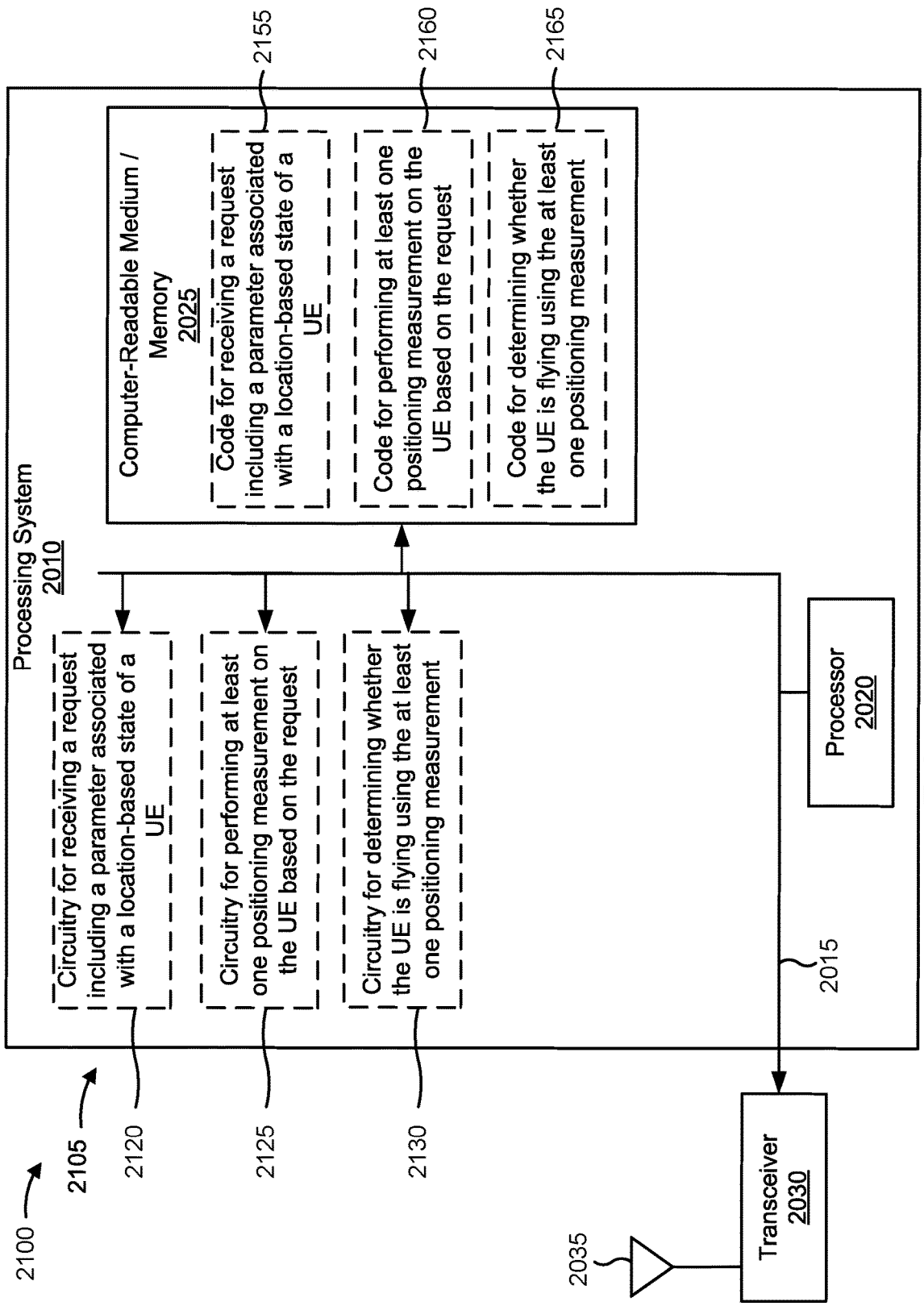
FIG. 21 is a diagram illustrating an example implementation of code and circuitry for an apparatus, in accordance with the present disclosure.

FIG. 21 is a diagram illustrating an example 2100 of an implementation of code and circuitry for an apparatus 2105. The apparatus 2105 may be an LMF, such as LMF 503, among other examples.

As further shown in FIG. 21, the apparatus may include circuitry for receiving a request including a parameter associated with a location-based state of UE (circuitry 2120). For example, the apparatus may include circuitry to enable the apparatus to receive a request including a parameter associated with a location-based state of UE.

As further shown in FIG. 21, the apparatus may include circuitry for performing at least one positioning measurement on the UE based on the request (circuitry 2125). For example, the apparatus may include circuitry to enable the apparatus to perform at least one positioning measurement on the UE based on the request.

As further shown in FIG. 21, the apparatus may include circuitry for determining whether the UE is flying using the at least one positioning measurement (circuitry 2130). For example, the apparatus may include circuitry to enable the apparatus to determine whether the UE is flying using the at least one positioning measurement.

As further shown in FIG. 21, the apparatus may include, stored in computer-readable medium 2025, code for receiving a request including a parameter associated with a location-based state of UE (code 2155). For example, the apparatus may include code that, when executed by the processor 2020, may cause the transceiver 2030 to receive a request including a parameter associated with a location-based state of UE.

As further shown in FIG. 21, the apparatus may include, stored in computer-readable medium 2025, code for performing at least one positioning measurement on the UE based on the request (code 2160). For example, the apparatus may include code that, when executed by the processor 2020, may cause the transceiver 2030 to perform at least one positioning measurement on the UE based on the request.

As further shown in FIG. 21, the apparatus may include, stored in computer-readable medium 2025, code for determining whether the UE is flying using the at least one positioning measurement (code 2165). For example, the apparatus may include code that, when executed by the processor 2020, may cause the processor 2020 to determine whether the UE is flying using the at least one positioning measurement.

FIG. 21 is provided as an example. Other examples may differ from what is described in connection with FIG. 21.

The following provides an overview of some Aspects of the present disclosure:

Aspect 1: A method of wireless communication performed by a radio access network (RAN) node, comprising: transmitting, to an access and mobility function (AMF) of a core network, a request associated with a location-based state of a user equipment (UE) served by the RAN node; and receiving a message in response to the request.

Aspect 2: The method of Aspect 1, wherein the request is encapsulated as an NG application protocol (NGAP) message including a location management function (LMF) selection request, and wherein the method further comprises: receiving an NGAP message including an LMF selection response with a routing identifier (ID) associated with an LMF selected by the AMF.

Aspect 3: The method of Aspect 2, further comprising: transmitting, to the AMF, a New Radio positioning protocol A (NRPPa) message associated with the location-based state of the UE, wherein the message in response to the request is encapsulated as an NRPPa message and is received from the AMF.

Aspect 4: The method of Aspect 2, wherein the LMF selection response further includes an ID associated with the UE and used by the LMF.

Aspect 5: The method of Aspect 4, further comprising: transmitting, to the LMF, a New Radio positioning protocol A (NRPPa) message associated with the location-based state of the UE, wherein the message in response to the request is encapsulated as an NRPPa message and is received from the LMF.

Aspect 6: The method of Aspect 1, wherein the request is encapsulated as an NG application protocol (NGAP) positioning information request and includes a parameter associated with the location-based state of the UE.

Aspect 7: The method of Aspect 6, wherein the message in response to the request is encapsulated as an NGAP positioning information response and is received from the AMF.

Aspect 8: The method of any of Aspects 1 through 7, wherein the message in response to the request indicates the location-based state, and the location-based state is associated with whether the UE is flying.

Aspect 9: The method of any of Aspects 1 through 7, wherein the message in response to the request includes measurements associated with the UE, and the method further comprises: determining whether the UE is flying using the measurements associated with the UE.

Aspect 10: The method of any of Aspects 1 through 9, further comprising: determining, using one or more properties associated with the UE, whether the request is encapsulated as a location management function (LMF) selection request or an NG application protocol (NGAP) positioning information request.

Aspect 11: The method of any of Aspects 1 through 10, wherein the request is transmitted based at least in part on a measurement performed by the RAN node and associated with the UE.

Aspect 12: The method of any of Aspects 1 through 11, wherein the request is transmitted based at least in part on subscription information associated with the UE.

Aspect 13: The method of any of Aspects 1 through 12, further comprising: receiving an indication of handover of the UE from the RAN node to an additional RAN node; and transmitting New Radio positioning protocol A (NRPPa) information associated with the request to the additional RAN node.

Aspect 14: A method of wireless communication performed by an access and mobility function (AMF) of a core network, comprising: receiving, from a radio access network (RAN) node, a request associated with a location-based state of a user equipment (UE) served by the RAN node; and transmitting a message in response to the request.

Aspect 15: The method of Aspect 14, wherein the request is encapsulated as an NG application protocol (NGAP) message including a location management function (LMF) selection request, and the message in response to the request is encapsulated as an NGAP message including an LMF selection response with a routing identifier (ID) associated with an LMF selected by the AMF.

Aspect 16: The method of Aspect 15, further comprising: receiving, from the RAN node, a New Radio positioning protocol A (NRPPa) message associated with the location-based state of the UE; transmitting, to the LMF selected by the AMF, a network function LMF (Nlmf) service operation message associated with the location-based state of the UE;

receiving, from the LMF, a network function AMF (Namf) message; and transmitting, to the RAN node, an NRPPa message based on the Namf message.

Aspect 17: The method of Aspect 15, further comprising: transmitting, to the LMF selected by the AMF, a network function LMF (Nlmf) session request message; and receiving, from the LMF, an Nlmf session response message including an ID associated with the UE and used by the LMF.

Aspect 18: The method of Aspect 17, wherein the LMF selection response further includes the ID associated with the UE and used by the LMF.

Aspect 19: The method of Aspect 14, wherein the request is encapsulated as an NG application protocol (NGAP) positioning information request and includes a parameter associated with the location-based state of the UE.

Aspect 20: The method of Aspect 19, wherein the message in response to the request is encapsulated as an NG application protocol (NGAP) positioning information response.

Aspect 21: The method of Aspect 20, further comprising: transmitting, to an LMF selected by the AMF, a network function LMF (Nlmf) location request; and receiving, from the LMF, an Nlmf location response, wherein the message in response to the request is based at least in part on the Nlmf location response.

Aspect 22: The method of any of Aspects 14 through 21, wherein the location-based state of the UE is associated with whether the UE is flying, and the method further comprises: determining whether the UE is flying.

Aspect 23: A method of wireless communication performed by a location management function (LMF) of a core network, comprising: receiving, from an access and mobility function (AMF) of the core network, a request including a parameter associated with a location-based state of a user equipment (UE) served by a radio access network (RAN) node; and performing at least one positioning measurement on the UE based on the request.

Aspect 24: The method of Aspect 23, wherein the request is encapsulated as a network function LMF (Nlmf) service operation message associated with the location-based state of the UE.

Aspect 25: The method of Aspect 24, further comprising: transmitting, to the AMF, a network function AMF (Namf) message based on the at least one positioning measurement.

Aspect 26: The method of Aspect 23, wherein the request is encapsulated as a network function LMF (Nlmf) session request message.

Aspect 27: The method of Aspect 26, further comprising: receiving, from the RAN node, a New Radio positioning protocol A (NRPPa) message associated with the location-based state of the UE; and transmitting, to the RAN node, an NRPPa message based on the at least one positioning measurement.

Aspect 28: The method of Aspect 23, wherein the request is encapsulated as a network function LMF (Nlmf) location request.

Aspect 29: The method of Aspect 28, further comprising: transmitting, to the AMF, an Nlmf location response based on the at least one positioning measurement.

Aspect 30: The method of any of Aspects 23 through 29, wherein the location-based state of the UE is associated with whether the UE is flying, and the method further comprises: determining whether the UE is flying using the at least one positioning measurement.

Aspect 31: An apparatus for wireless communication at a device, comprising a processor; memory coupled with the processor; and instructions stored in the memory and executable by the processor to cause the apparatus to perform the method of one or more of Aspects 1-13.

Aspect 32: A device for wireless communication, comprising a memory and one or more processors coupled to the memory, the one or more processors configured to perform the method of one or more of Aspects 1-13.

Aspect 33: An apparatus for wireless communication, comprising at least one means for performing the method of one or more of Aspects 1-13.

Aspect 34: A non-transitory computer-readable medium storing code for wireless communication, the code comprising instructions executable by a processor to perform the method of one or more of Aspects 1-13.

Aspect 35: A non-transitory computer-readable medium storing a set of instructions for wireless communication, the set of instructions comprising one or more instructions that, when executed by one or more processors of a device, cause the device to perform the method of one or more of Aspects 1-13.

Aspect 36: An apparatus for wireless communication at a device, comprising a processor; memory coupled with the processor; and instructions stored in the memory and executable by the processor to cause the apparatus to perform the method of one or more of Aspects 14-22.

Aspect 37: A device for wireless communication, comprising a memory and one or more processors coupled to the memory, the one or more processors configured to perform the method of one or more of Aspects 14-22.

Aspect 38: An apparatus for wireless communication, comprising at least one means for performing the method of one or more of Aspects 14-22.

Aspect 39: A non-transitory computer-readable medium storing code for wireless communication, the code comprising instructions executable by a processor to perform the method of one or more of Aspects 14-22.

Aspect 40: A non-transitory computer-readable medium storing a set of instructions for wireless communication, the set of instructions comprising one or more instructions that, when executed by one or more processors of a device, cause the device to perform the method of one or more of Aspects 14-22.

Aspect 41: An apparatus for wireless communication at a device, comprising a processor; memory coupled with the processor; and instructions stored in the memory and executable by the processor to cause the apparatus to perform the method of one or more of Aspects 23-30.

Aspect 42: A device for wireless communication, comprising a memory and one or more processors coupled to the memory, the one or more processors configured to perform the method of one or more of Aspects 23-30.

Aspect 43: An apparatus for wireless communication, comprising at least one means for performing the method of one or more of Aspects 23-30.

Aspect 44: A non-transitory computer-readable medium storing code for wireless communication, the code comprising instructions executable by a processor to perform the method of one or more of Aspects 23-30.

Aspect 45: A non-transitory computer-readable medium storing a set of instructions for wireless communication, the set of instructions comprising one or more instructions that, when executed by one or more processors of a device, cause the device to perform the method of one or more of Aspects 23-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a radio access network (RAN) node, comprising:
   one or more memories; and
   one or more processors, coupled to the one or more memories, which are configured, individually or in any combination, to:
      transmit, to an access and mobility function (AMF) of a core network, a request message requesting information corresponding to a location-based state of a user equipment (UE) served by the RAN node;
      receive a message in response to the request, the message comprising the information; and
      provide or disallow data services to the UE based at least in part on the information.

2. The apparatus of claim 1, wherein the request is encapsulated as an NG application protocol (NGAP) message including a location management function (LMF) selection request, and wherein the one or more memories and the one or more processors are configured to:
   receive an NGAP message including an LMF selection response with a routing identifier (ID) associated with an LMF selected by the AMF.

3. The apparatus of claim 2, wherein the one or more memories and the one or more processors are configured to:
   transmit, to the AMF, a New Radio positioning protocol A (NRPPa) message associated with the location-based state of the UE,
      wherein the message in response to the request is encapsulated as an NRPPa message and is received from the AMF.

4. The apparatus of claim 2, wherein the LMF selection response further includes an ID associated with the UE and used by the LMF.

5. The apparatus of claim 4, wherein the one or more memories and the one or more processors are configured to:
   transmit, to the LMF, a New Radio positioning protocol A (NRPPa) message associated with the location-based state of the UE,
      wherein the message in response to the request is encapsulated as an NRPPa message and is received from the LMF.

6. The apparatus of claim 1, wherein the request is encapsulated as an NG application protocol (NGAP) positioning information request and includes a parameter associated with the location-based state of the UE.

7. The apparatus of claim 6, wherein the message in response to the request is encapsulated as an NGAP positioning information response and is received from the AMF.

8. The apparatus of claim 1, wherein the message in response to the request indicates the location-based state, and the location-based state is associated with whether the UE is flying.

9. The apparatus of claim 1, wherein the message in response to the request includes measurements associated with the UE, and the one or more memories and the one or more processors are configured to:
   determine whether the UE is flying using the measurements associated with the UE.

10. The apparatus of claim 1, wherein the one or more memories and the one or more processors are configured to:
   determine, using one or more properties associated with the UE, whether the request is encapsulated as a location management function (LMF) selection request or an NG application protocol (NGAP) positioning information request.

11. The apparatus of claim 1, wherein the request is transmitted based at least in part on a measurement performed by the RAN node and associated with the UE.

12. The apparatus of claim 1, wherein the request is transmitted based at least in part on subscription information associated with the UE.

13. The apparatus of claim 1, wherein the one or more memories and the one or more processors are configured to:
receive an indication of handover of the UE from the RAN node to an additional RAN node; and
transmit New Radio positioning protocol A (NRPPa) information associated with the request to the additional RAN node.

14. The apparatus of claim 1, wherein the one or more memories and the one or more processors, configured to provide or disallow the data services, are configured to:
allocate frequency resources to the UE based at least in part on the information.

15. An apparatus for wireless communication at an access and mobility function (AMF) of a core network, comprising:
one or more memories; and
one or more processors, coupled to the one or more memories, which are configured, individually or in any combination, to:
receive, from a radio access network (RAN) node, a request message requesting information corresponding to a location-based state of a user equipment (UE) served by the RAN node; and
transmit a message in response to the request, the message comprising the information, wherein the information is for use by the RAN node to provide or disallow data services to the UE.

16. The apparatus of claim 15, wherein the request is encapsulated as an NG application protocol (NGAP) message including a location management function (LMF) selection request, and the message in response to the request is encapsulated as an NGAP message including an LMF selection response with a routing identifier (ID) associated with an LMF selected by the AMF.

17. The apparatus of claim 16, wherein the one or more memories and the one or more processors are configured to:
receive, from the RAN node, a New Radio positioning protocol A (NRPPa) message associated with the location-based state of the UE;
transmit, to the LMF selected by the AMF, a network function LMF (Nlmf) service operation message associated with the location-based state of the UE;
receive, from the LMF, a network function AMF (Namf) message; and
transmit, to the RAN node, an NRPPa message based on the Namf message.

18. The apparatus of claim 16, wherein the one or more memories and the one or more processors are configured to:
transmit, to the LMF selected by the AMF, a network LMF (Nlmf) session request message; and
receive, from the LMF, an Nlmf session response message including an identifier (ID) associated with the UE and used by the LMF.

19. The apparatus of claim 18, wherein the LMF selection response further includes the ID associated with the UE and used by the LMF.

20. The apparatus of claim 15, wherein the request is encapsulated as an NG application protocol (NGAP) positioning information request and includes a parameter associated with the location-based state of the UE.

21. The apparatus of claim 20, wherein the message in response to the request is encapsulated as an NG application protocol (NGAP) positioning information response.

22. The apparatus of claim 21, wherein the one or more memories and the one or more processors are configured to:
transmit, to an LMF selected by the AMF, a network function LMF (Nlmf) location request; and
receive, from the LMF, an Nlmf location response, wherein the message in response to the request is based at least in part on the Nlmf location response.

23. The apparatus of claim 15, wherein the location-based state of the UE is associated with whether the UE is flying, and the one or more memories and the one or more processors are configured to:
determine whether the UE is flying.

24. An apparatus for wireless communication at a location management function (LMF) of a core network, comprising:
one or more memories; and
one or more processors coupled to the one or more memories, which are configured individually or in any combination, to:
receive, from an access and mobility function (AMF) of the core network, a request comprising a parameter associated with a location-based state of a user equipment (UE), associated with whether the UE is flying, served by a radio access network (RAN) node;
perform at least one positioning measurement on the UE based on the request; and
transmit, to the AMF, information indicating whether the UE is flying, wherein the information is for use by the RAN node to provide or disallow data services to the UE.

25. The apparatus of claim 24, wherein the request is encapsulated as a network function LMF (Nlmf) service operation message associated with the location-based state of the UE.

26. The apparatus of claim 25, wherein the one or more memories and the one or more processors are configured to:
transmit, to the AMF, a network function AMF (Namf) message based on the at least one positioning measurement.

27. The apparatus of claim 24, wherein the request is encapsulated as a network function LMF (Nlmf) session request message.

28. The apparatus of claim 27, wherein the one or more memories and the one or more processors are configured to:
receive, from the RAN node, a New Radio positioning protocol A (NRPPa) message associated with the location-based state of the UE; and
transmit, to the RAN node, an NRPPa message based on the at least one positioning measurement.

29. The apparatus of claim 24, wherein the request is encapsulated as a network function LMF (Nlmf) location request.

30. The apparatus of claim 29, wherein the one or more memories and the one or more processors are configured to:
transmit, to the AMF, an Nlmf location response based on the at least one positioning measurement.

31. The apparatus of claim 24, wherein the one or more memories and the one or more processors are configured to:
determine whether the UE is flying using the at least one positioning measurement.

32. A method of wireless communication performed by a radio access network (RAN) node, comprising:
transmitting, to an access and mobility function (AMF) of a core network, a request message requesting information corresponding to a location-based state of a user equipment (UE) served by the RAN node;

receiving a message in response to the request, the message comprising the information; and providing or disallowing data services to the UE based at least in part on the information.

33. The method of claim 32, wherein the request is encapsulated as an NG application protocol (NGAP) message including a location management function (LMF) selection request, and wherein the method further comprises:

receiving an NGAP message including an LMF selection response with a routing identifier (ID) associated with an LMF selected by the AMF.

34. The method of claim 33, further comprising:

transmitting, to the AMF, a New Radio positioning protocol A (NRPPa) message associated with the location-based state of the UE, wherein the message in response to the request is encapsulated as an NRPPa message and is received from the AMF.

35. The method of claim 32, wherein the request is encapsulated as an NG application protocol (NGAP) positioning information request and includes a parameter associated with the location-based state of the UE, and wherein the message in response to the request is encapsulated as an NGAP positioning information response and is received from the AMF.

* * * * *